(12) United States Patent
Katayama et al.

(10) Patent No.: US 6,567,744 B1
(45) Date of Patent: May 20, 2003

(54) IN-VEHICLE NAVIGATION APPARATUS

(75) Inventors: Mutsumi Katayama, Saitama (JP); Hiroyuki Morita, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/808,182

(22) Filed: Mar. 15, 2001

(30) Foreign Application Priority Data

Mar. 15, 2000 (JP) ........................................ 2000-072807

(51) Int. Cl.⁷ .......................... G01C 21/00; G06F 15/50
(52) U.S. Cl. ...................... 701/209; 701/211; 701/212; 340/995
(58) Field of Search ................................ 701/209, 208, 701/207, 210, 211, 212; 340/990, 995; 342/357.13

(56) References Cited

U.S. PATENT DOCUMENTS

| | | | | | |
|---|---|---|---|---|---|
| 4,736,303 | A | * | 4/1988 | Itoh et al. ................... | 340/988 |
| 5,084,822 | A | * | 1/1992 | Hayami ....................... | 340/990 |
| 5,179,519 | A | * | 1/1993 | Adachi et al. ............... | 340/990 |
| 5,274,387 | A | * | 12/1993 | Kakihara et al. ............ | 342/451 |
| 5,732,385 | A | * | 3/1998 | Nakayama et al. ......... | 340/995 |
| 6,144,318 | A | * | 11/2000 | Hayashi et al. ............. | 340/988 |
| 6,266,589 | B1 | * | 7/2001 | Boies et al. .................... | 701/1 |
| 6,320,517 | B1 | * | 11/2001 | Yano et al. .................. | 340/988 |

FOREIGN PATENT DOCUMENTS

| | | | | |
|---|---|---|---|---|
| JP | 1-199114 | | 8/1989 | |
| JP | 02-130412 | * | 5/1990 | ........... G01C/21/00 |
| JP | 5-32681 B2 | | 5/1993 | |

* cited by examiner

Primary Examiner—Michael J. Zanelli
Assistant Examiner—Eric Gibson
(74) Attorney, Agent, or Firm—Birch, Stewart, Kolasch & Birch, LLP

(57) ABSTRACT

A size of an area extending along a planned route is changed in accordance with a detected vehicle's speed. Map information corresponding to the extending area is extracted from the map information stored in map information storage means. The extracted map information is displayed, along with vehicle's current location, on display means.

15 Claims, 24 Drawing Sheets

| ROUTE | SECTION DISTANCE | EXTRACTION WIDTH | NECESSARY STORAGE SPACE |
|---|---|---|---|
| $r_1$ | $L_1$ | $\Delta W_1$ | $L_1 \times \Delta W_1$ |
| $r_2$ | $L_2$ | $\Delta W_2$ | $L_2 \times \Delta W_2$ |
| ⋮ | ⋮ | ⋮ | ⋮ |
| $r_i$ | $L_i$ | $\Delta W_i$ | $L_i \times \Delta W_i$ |
| ⋮ | ⋮ | ⋮ | ⋮ |
| $r_{n-1}$ | $L_{n-1}$ | $\Delta W_{n-1}$ | $L_{n-1} \times \Delta W_{n-1}$ |

FIG.15

IN-VEHICLE NAVIGATION APPARATUS

BACKGROUND OF THE INVENTION

1. Field of the Invention

The present invention relates generally to in-vehicle navigation systems for displaying map information and current positional information.

2. Related Art

There are various types of in-vehicle navigation systems that display both map information and current positional information. Such a system is disclosed in Japanese Published Examined Patent Application No. Hei 5-32681. The disclosed apparatus detects the travel distance and travel direction of a vehicle on which the apparatus is mounted, obtains a vehicle's current location from the detected travel distance and travel direction, and shows the map information about the obtained current location and the obtained current location itself on a display unit.

The prior-art in-vehicle navigation apparatus displays the same information when the vehicle is running as the information which is provided when the vehicle is in a stopped state. Therefore, the display unit of the in-vehicle navigation apparatus inevitably supplies more information than necessary for the driver of the vehicle in a running vehicle to get to a destination. This requires time and effort for the driver to properly select only the necessary information from that which is provided on the display unit.

SUMMARY OF THE INVENTION

An object of the present invention is to provide an in-vehicle navigation apparatus for displaying appropriate information in accordance with vehicle's travel states.

In carrying out the invention and according to one aspect thereof, there is provided an in-vehicle navigation apparatus including current positional information generating means for detecting a current location of a vehicle and generating current positional information, map information storage means for storing map information including road information, display map information generating means for reading map information on a predetermined area from the map information storage means on the basis of the current positional information and generating display map information from the map information thus read, and display means for displaying the display map information and the current positional information. The in-vehicle navigation apparatus further includes a travel route planning means for planning a travel route of the vehicle on the basis of the road information, and vehicle speed detecting means for detecting a speed at which the vehicle travels. The display map information generating means changes a size of an extending area which extends along the travel route in accordance with the vehicle speed and extracts map information corresponding to the extending area from the map information read from the map information storage means, thereby providing the display map information.

Namely, according to the present invention, the size of the extending area which extends along a planned travel route to a destination in accordance with the travel speed of a vehicle and the map information corresponding to the changed size of the extending area is displayed. Consequently, only the information is displayed that is necessary for the driver in the running vehicle to get to the destination.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 15 is a rectangular map information table to be generated by executing the subroutine shown in FIG. 12;

DETAILED DESCRIPTION OF THE PREFERRED EMBODIMENTS

Figure 1:
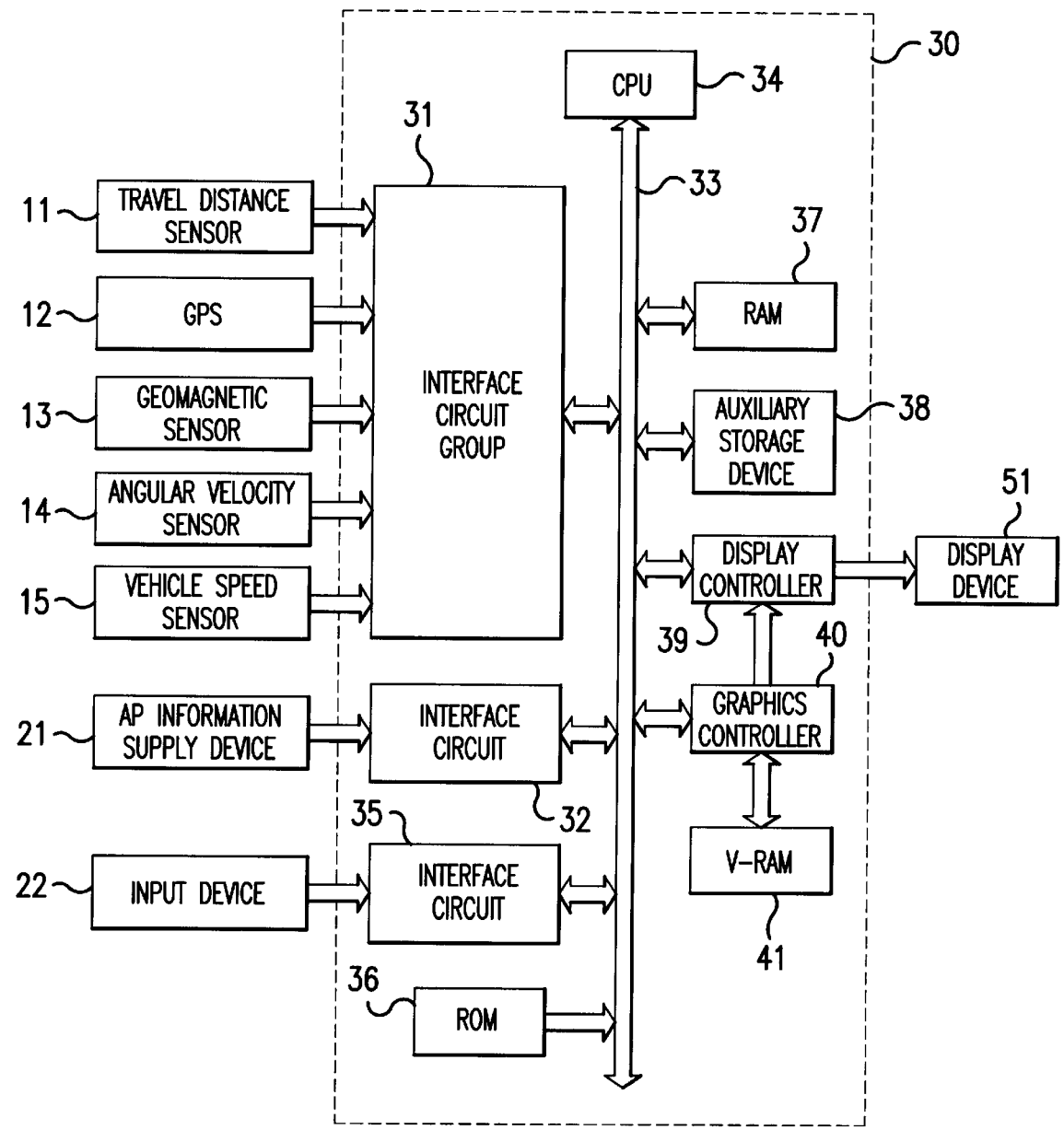
FIG. 1 is a block diagram illustrating an in-vehicle navigation apparatus according to the present invention.

Now, referring to FIG. 1, there is shown a block diagram illustrating an exemplary configuration of an in-vehicle navigation system according to the present invention. A travel distance sensor 11 detects a distance traveled by a vehicle. A GPS (Global Positioning System) 12 detects a vehicle's current location from longitude and latitude information. A geomagnetic sensor 13 detects a bearing of the vehicle on the basis of geomagnetism (earth's magnetism). An angular velocity sensor 14 detects an angular velocity of the vehicle. A vehicle speed sensor 15 detects a running speed of the vehicle on the basis of the number of pulses generated in proportion to the rotational angle of the drive shaft of the vehicle. The signals outputted from these sensors 11 through 15 are supplied to an interface circuit group 31. It should be noted that the GPS 12 is connected with a GPS antenna (not shown) for obtaining radio signals sent from an artificial satellite, or a plurality of satellites.

A map information supply device 21 is constituted by a CD-ROM drive or a DVD drive for reading map information from a nonvolatile recording medium such as CD-ROM or DVD. The map information read from the recording media is supplied to an interface circuit 32.

The interface circuit group 31 and the interface circuit 32 are connected to an input/output bus 33 of a controller 30. The input/output bus 33 is adapted to input/output data signals and address signals with a central processing unit (CPU) .34. The output signals of the above-mentioned sensors 11 through 15 and the map information read by the map information supply device 21 are read by a command issued by the CPU 34 in a predetermined timing relation, to be supplied to the input/output bus 33.

An input device 22 is connected to an interface circuit 35 which is connected to the input/output bus 33. Various commands issued from the input device 22 in response to the driver's operations are supplied to the CPU 34 via the interface circuit 35. The input device 22 is constituted by a keyboard having an enter key (not shown) for entering the decision items shown on a display device 51 to be described later and a select key (not shown) for specifying locations on maps shown on the display device 51. In addition, the input device 22 may have a pointing device such as a mouse for specifying locations on maps shown on the display device 51. The input/output bus 33 is also connected to a ROM (Read Only Memory) 36 and a RAM (Random Access Memory) 37. The ROM 36 stores a program for displaying map information on the display device 51 and a program for generating rectangular area map information for example. On the other hand, the RAM 37 stores the map information of predetermined areas to be shown on the display device 51 and the variables of programs to be executed. The RAM 37 is constituted by a nonvolatile memory for example, which retains its contents after the power thereto is turned off. The present embodiment may also be configured so as to connect an auxiliary storage device 38 to the input/output bus 33 as shown in FIG. 1. The auxiliary storage device 38, composed of an IC card constituted by a nonvolatile memory and an interface circuit (not shown), stores information which is too large in size to be accommodated in the RAM 37.

The input/output bus 33 is further connected to a display controller 39 and a graphics controller 40. The display controller 39 is connected to the display device 51. The graphics controller 40 writes data to a V-RAM 41 and reads data therefrom as instructed by the CPU 34. The display controller 39 controls the display device 51 in accordance with the image information outputted from the graphics controller 40.

Figure 2:
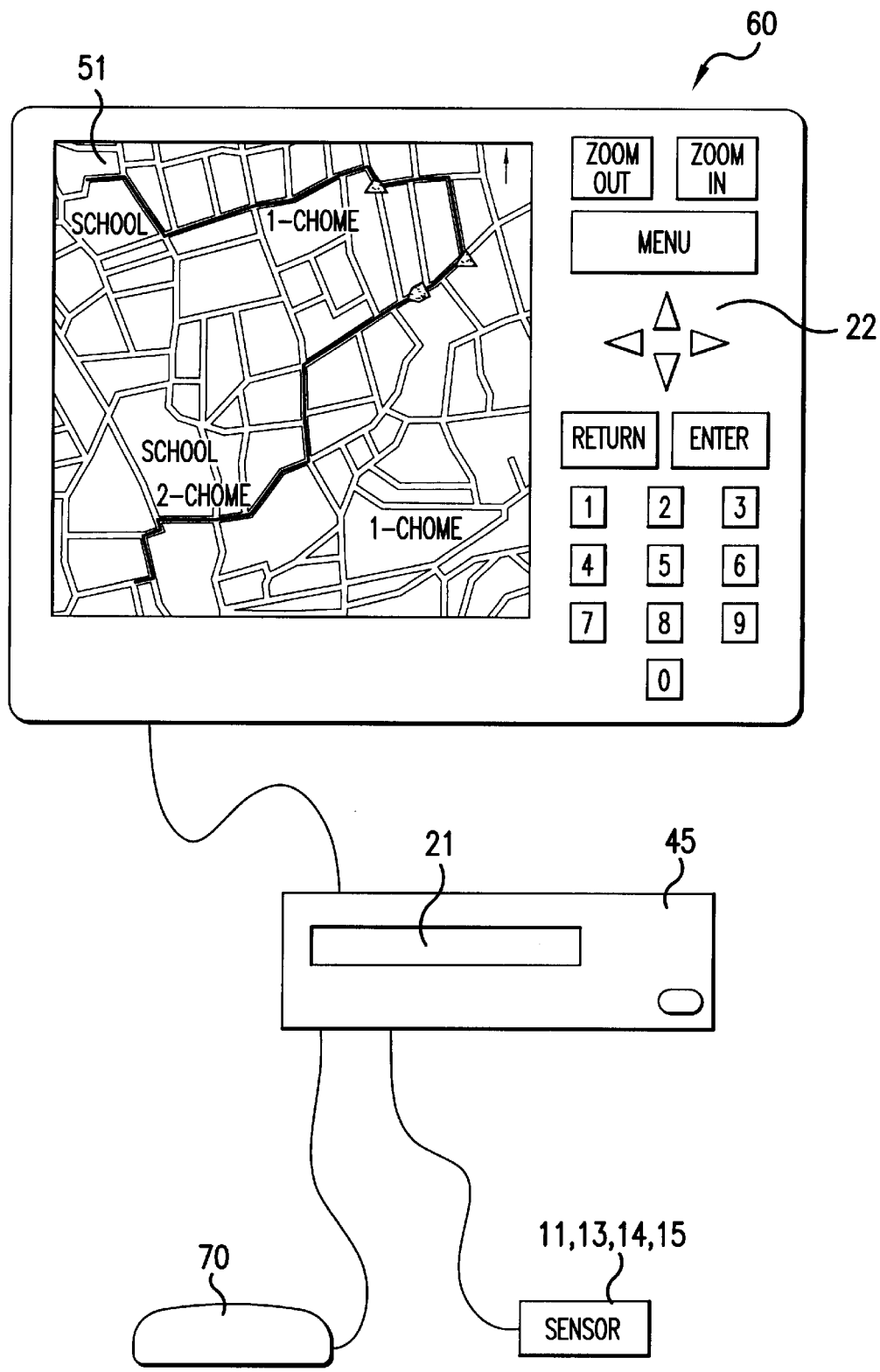
FIG. 2 is a schematic view of a first embodiment of the present invention.

Referring to FIG. 2, there is shown a configuration of the in-vehicle navigation apparatus practiced as one embodiment of the present invention. A display input section 60 is composed of the display device 51 and the input device 22. The display device 51 shows symbols including a pentagonal shape indicative of current vehicle locations, map information, and a planned travel route to a destination. The input device 22 is composed of zoom-in and zoom-out keys for zooming in and out the images shown on the display device 51, a menu key shown in a processing menu on the display device 51, triangular select keys for selecting processing items from the shown menu, an enter key for inputting a selected processing item, and a return key.

If the driver is required to set numeric values, preset values are shown on the display device 51 and the driver selects desired values by operating the above-mentioned select keys. If there is room in the key arrangement on the input device 22, ten keys may be disposed thereon as shown in FIG. 2, from which the driver directly inputs desired values.

The display input section 60 is connected to a controller 45 with a connection line. The controller 45 is connected to a GPS antenna 70 with an antenna line. Further, the controller 45 is connected to sensors 11, 13, 14, and 15 such as the vehicle speed sensor mentioned above with a connection line. The controller 45 includes the controller 30, the GPS 12, and the map information supply device 21 shown in FIG. 1.

In this first embodiment, current positional information generating means is constituted by the travel distance sensor 11, the GPS sensor 12, the geomagnetic sensor 13, and the angular velocity sensor 14. Map information storage means is constituted by the map information supply device 21 and the RAM 37. Display map information generating means is constituted by the CPU 34, the ROM 36, the RAM 37, the V-RAM 41, and the input/output bus 33. Display means is constituted by the display controller 39 and the display device 51.

The following description will be made based upon the supposition that the in-vehicle navigation apparatus is in an active state and normally operating with the starting processing such as the initialization of the variables for use in the CPU 34 completed.

Figure 3:
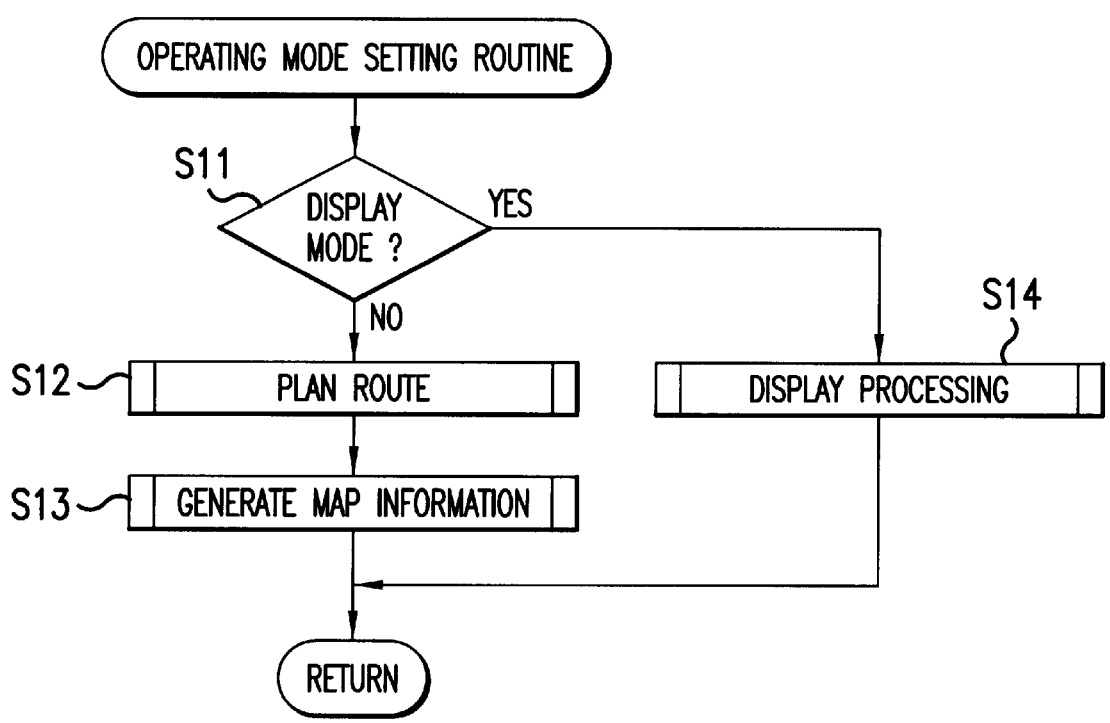
FIG. 3 is a flowchart of a subroutine for setting an operation mode of the in-vehicle navigation apparatus.

Referring to FIG. 3, there is shown a subroutine for setting an operating mode of the in-vehicle navigation apparatus. The operating mode is set when the driver selects a desired operating mode by operating corresponding keys such as from the above-mentioned menu key.

First, a prompt is displayed on the display device 51 to make the driver select a travel route planning mode or a map information display mode (step S11). If the travel route planning mode is selected, a travel route planning subroutine to be described later is executed (step S12), map information is generated on the basis of the inputted settings (step S13), and then this subroutine is ended. On the other hand, if the map information display mode is selected, a display processing subroutine to be described later is executed (step S14) and then this subroutine is ended.

Figure 4:
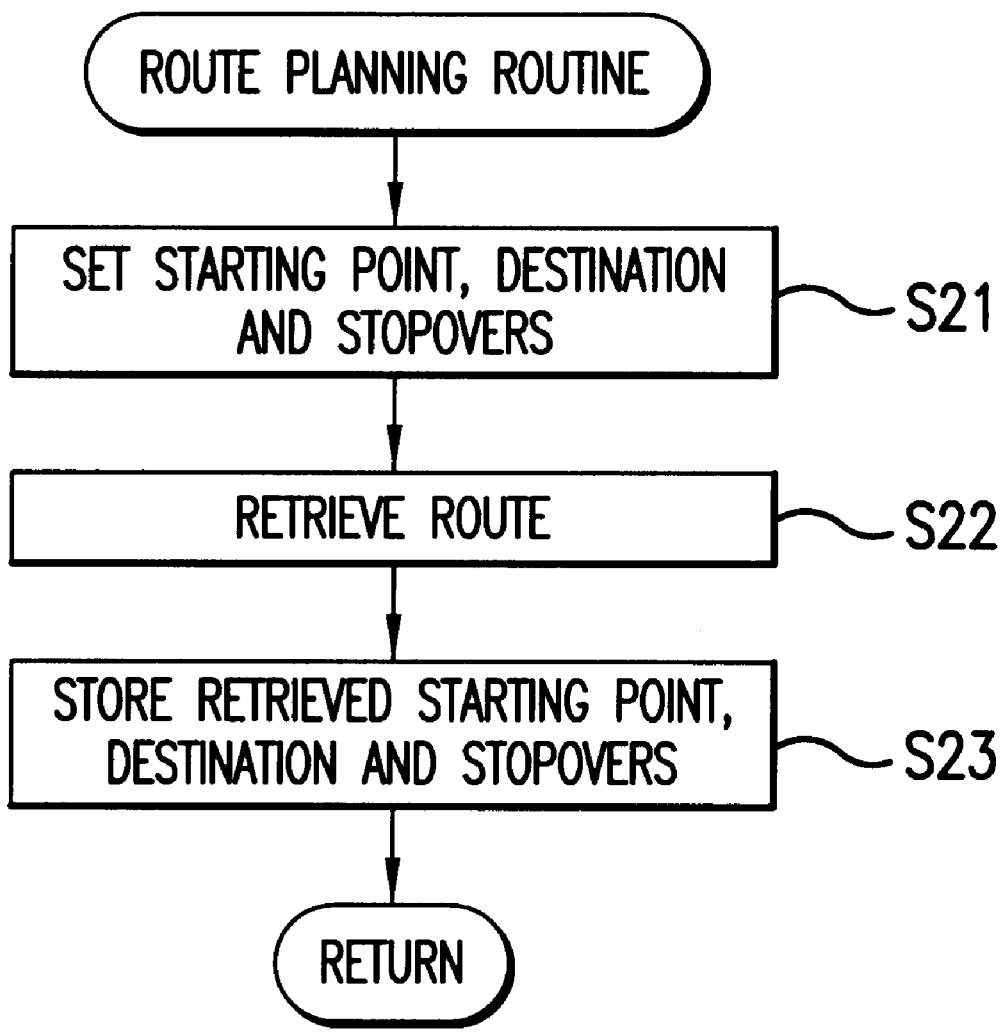
FIG. 4 is a flowchart of a subroutine for planning a vehicle's travel route.

Referring to FIG. 4, there is shown a subroutine for setting the above-mentioned travel route planning mode.

First, a starting point, destination, and stopovers are set through the input device 22 (step S21). For these settings, the coordinate information for these points, for example latitude and longitude data are set by the input operation made on the keyboard or the mouse. For the input operation, a map is shown on the display device 51 in advance and a pointer for specifying each point, for example a cross or an arrow, is superimposed on the displayed map. The driver moves this pointer by operating the keyboard or the mouse to each point to specify it. If there are two or more matching place names in the vicinity of a specified point, these place names may be shown on the display device 51 for selection by the select key. When one place name is determined, one piece of coordinate data corresponding to that place name can be retrieved. Moreover, for an easier input operation and/or an higher display visibility, a capability may be provided by which the maps shown on the display device 51 can be zoomed in and out by operating a "zoom-in" key and a "zoom-out" key. Now, let the starting point be $P_1$, the destination be $P_n$, and the stopovers be $P_2, \ldots$ (omitted) $\ldots$, $P_i \ldots$ (omitted) $\ldots, P_{n-1}$. Sections between two continuous points, such as $P_1-P_2$ and $P_i-P_{i-1}$, are called 2-point sections.

Next, a route along which the vehicle is to travel is searched for on the map shown in display device 51 from the coordinate information on $P_1$ through $P_n$ and the road information included in the map information and the retrieved route is set (step S22). It should be noted that, for the route search processing, known methods exist, such as those disclosed in Japanese Patent Laid-open Nos. Hei 7-55481 and Hei 7-91971 for example. If there are two or more possible routes in a 2-point section, they may be shown on the map for selection by the driver by means of a pointer shown on the display device 51 as with the above-mentioned place name selection by use of the keyboard or the mouse. In what follows, a route set in 2-point section $P_1-P_2$ is referred to as $r_1$, a route set in 2-point section $P_i-P_{i-1}$ as $r_i$, a route set in 2-point section $P_{n-1}-P_n$ as $r_{n-1}$. Each route set in each 2-point section is referred to as $r_i$ (i=1, . . . (omitted) . . . , n−1). Next, the starting point, the destination, and the stopovers set in step S21 and the routes retrieved in step S22 are stored in the RAM 37 (step S23), upon which this subroutine comes to an end. In what follows, the above-mentioned starting point, destination, and stopovers are referred to as planned route information.

Figure 5:
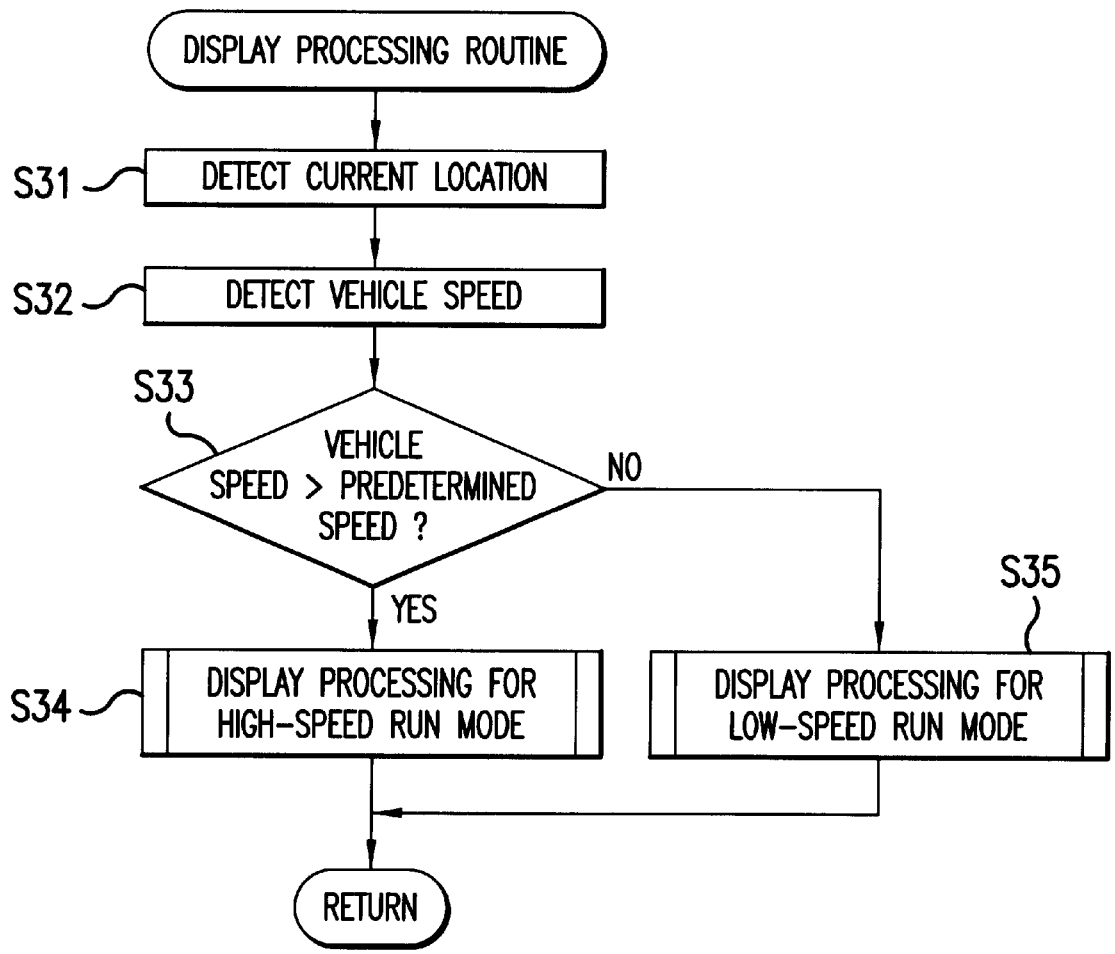
FIG. 5 is a flowchart of a subroutine for changing the displayed information in accordance with vehicle's speeds.

Referring to FIG. 5, there is shown a display processing subroutine to be executed when the map information display mode is selected in step S14 shown in FIG. 3. It should be noted that this subroutine is called, in a predetermined timed relation, from the main routine being executed by the CPU 34.

First, a vehicle's starting point is detected from the GPS 12 and the current location data are retrieved (step S31). Next, a vehicle speed is detected (step S32). The vehicle speed is obtained on the basis of the signal outputted from the vehicle speed sensor 15. Alternatively, the vehicle velocity may be obtained by computing the vehicle's current positional data sequentially supplied from the GPS 12 in step S31.

Next, it is determined whether the vehicle speed is greater than or equal to a predetermined speed, for example 4 km/hour, (step S33). If the decision is yes, a display process in the high-speed run mode to be described later is executed (step S34), upon which this subroutine comes to an end. On the other hand, if the vehicle speed is found lower than the predetermined speed, a display process in the low-speed run mode to be described later is executed (step S35), upon which this subroutine comes to an end.

It should be noted that the above-mentioned predetermined speed may be stored in the ROM 36 beforehand or specified by the driver.

Figure 6:
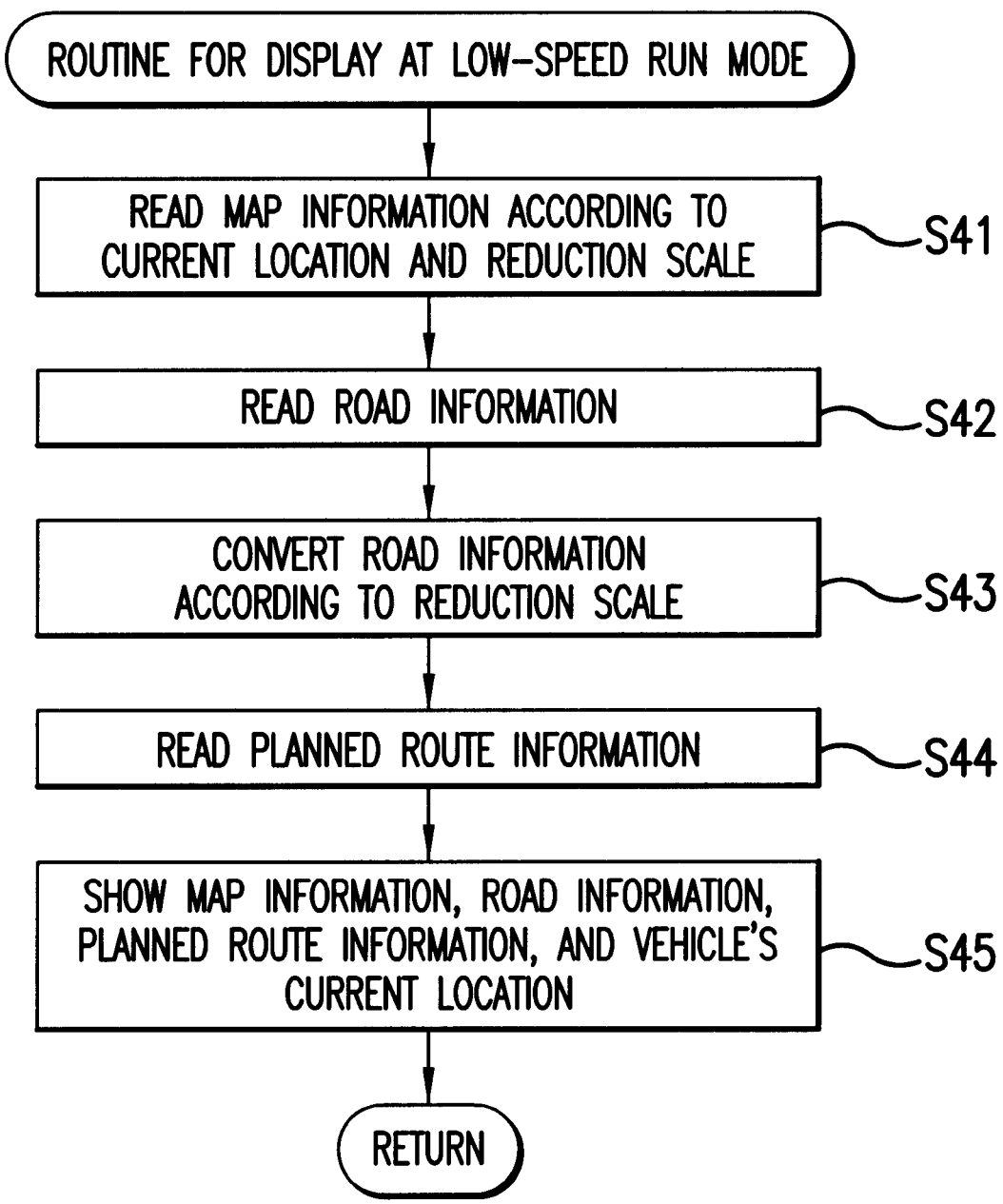
FIG. 6 is a flowchart of a subroutine for display processing to be executed in the low-speed run mode.

Referring to FIG. 6, there is shown a subroutine to be executed in step S35 in the low-speed run mode or in a stopped state for example.

First, the map information on a predetermined area is read from the map information supply device 21 in accordance with the vehicle's current positional information and a preset reduction scale (step S41), and the retrieved map information is stored in the RAM 37. This reduction scale is determined by selecting a scale level, which is executed by the driver by operating the zoom-out key or the zoom-in key of the input device 22 shown in FIG. 2. The recording medium such as CD-ROM or DVD contains the map information corresponding to plural scale levels. For example, in the case of a CD-ROM from which the map information relating to Japan can be read with 14 scale levels, each piece of map information corresponding to each of the scale levels 1 through 14 is stored thereon. When one of the scale levels is selected in step S41, the map information corresponding to the selected scale level is read from the CD-ROM and shown on the display device 51.

After the process of step S41, road information is read from the map information supply device 21 (step S42). This road information is stored in the recording medium such as CD-ROM and DVD as vector data. The road information read from the recording medium is processed in accordance with the scale level selected in step S41 and is converted into display data to be shown on the display device 51 (step S43).

The planned route information planned in step S23 shown in FIG. 4 is read from the RAM 37 (step S44). The map information read from the RAM 37 and the converted road information are shown on the display device 51 (step S45), upon which this subroutine comes to an end.

Figure 7:
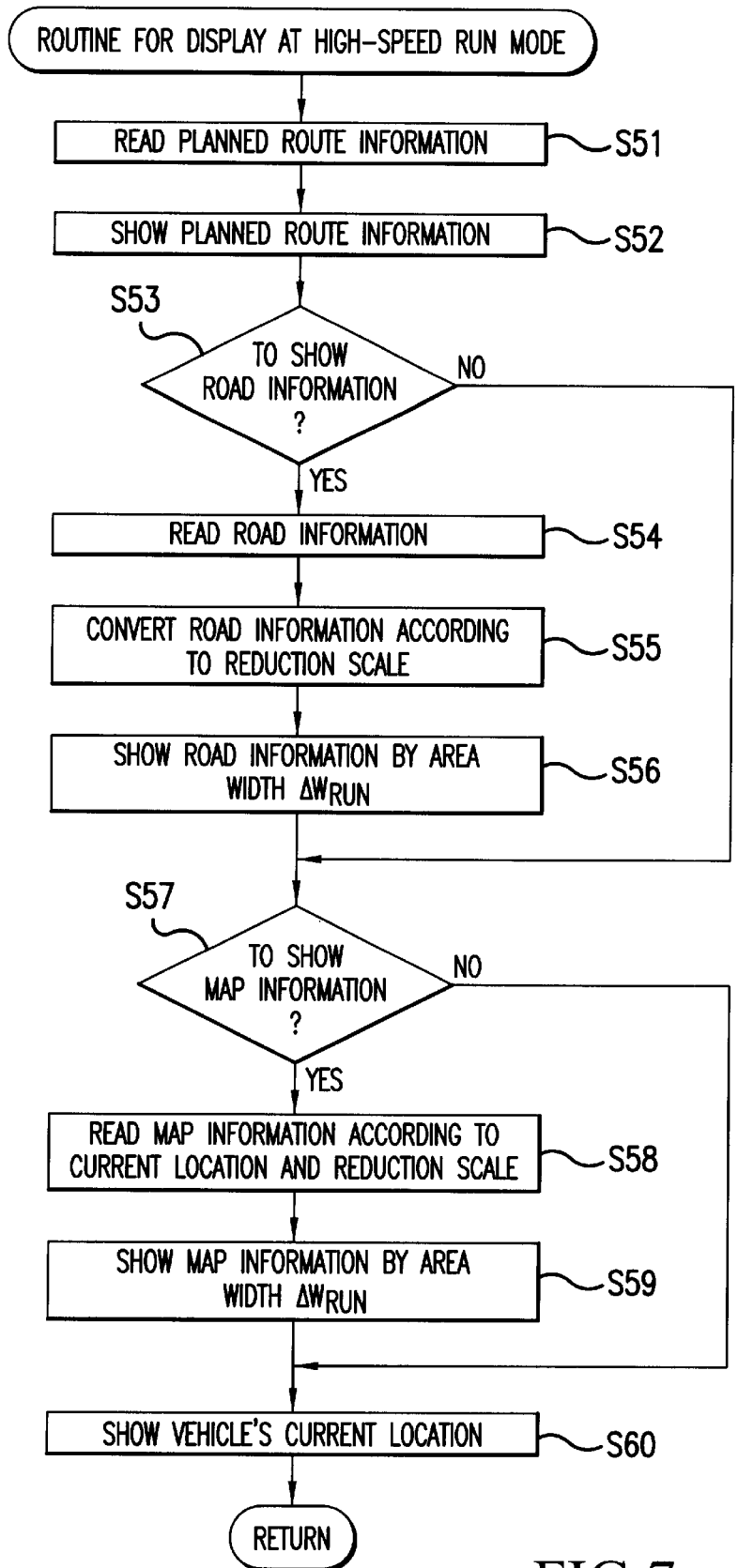
FIG. 7 is a flowchart of a subroutine for display processing to be executed in the high-speed run mode.

If the vehicle speed is found higher than the predetermined speed in step S33 of the subroutine shown in FIG. 5, the display processing in the high-speed run mode as shown in FIG. 7 is executed.

First, the planned route information planned in step S23 shown in FIG. 4 is read from the RAM 37 (step S51) and shown on the display device 51 (step S52).

Next, it is determined whether the displaying of the road information has been set or not (step S53). This setting is made by the driver beforehand. For example, when the driver operates the menu key of the input device 22 shown in FIG. 2, a setting screen is shown on the display device 51, on which the driver selects or does not select the displaying of the road information. If the displaying of the road information is selected in step S53, the road information is read from the map information supply device 21 (step S54). This road information is stored in the recording medium such as CD-ROM or DVD as vector data as described above. The road information read from the recording medium is converted into display data in accordance with the preset scale level (step S55). Then, the converted road information is shown on the display device 51 along the planned travel route by a predetermined area width $\Delta W_{RUN}$, for example 3 km (step S56). On the other hand, if the road information is determined not to be shown, this subroutine goes to step S57 without showing the road information.

Next, it is determined whether the setting for showing the map information has been made or not (step S57). This setting is selected by the driver beforehand as with the setting for road information displaying described above. If the displaying is determined, the map information corresponding to a predetermined area is read from the map information supply device 21 in accordance with the vehicle's current positional information and the preset scale level (step S58) to be stored in the RAM 37. Then, the map information, of the read map information, included in a rectangular area extending along the planned route is shown on the display device 51 by an area width $\Delta W_{RUN}$, for example 3 km (step S59), the vehicle's current location is shown (step S60), and this subroutine comes to an end.

It should be noted that the value of the area width $\Delta W_{RUN}$ used in steps S56 and S58 may be a default value as stored in the ROM 36 or may be set by the driver.

If no new map information need be read when reading the map information from the map information supply device 21 in steps S41 and S58, for example, if the vehicle travel distance obtained from the current location detected in step S31 described above is small enough for requiring no updating of the map information stored in the RAM 37, the rectangular area map information may be generated by use of the map information currently stored in the RAM 37 or the data corresponding to areas other than the rectangular area may be deleted by manipulating the display information currently stored in the V-RAM 41.

In the above-mentioned embodiment, it is determined in step S33 if the vehicle speed is higher than a specific predetermined speed and the subroutine branches to two processes for the displaying in the low-speed run mode and the displaying in the high-speed run mode to show the display information such as the map information. It will be apparent to those skilled in the art that the vehicle speed may be compared with two or more predetermined speeds to show resultant display information.

Further, the above-mentioned area width $\Delta W_{RUN}$ of the road information to be shown in step S56 or the above-mentioned area width $\Delta W_{RUN}$ of the map information to be displayed in step S59 may be changed in accordance with the vehicle speed. For example, the area width $\Delta W_{RUN}$ may be changed in proportion to the vehicle speed or the area width $\Delta W_{RUN}$ may be obtained from the vehicle speed by executing a computation by use of a predetermined function.

In the above-mentioned embodiment, it is determined in step S53 if the road information is to be shown or not and it is determined in step S57 if the map information is to be shown or not. It will be apparent to those skilled in the art that, without making these decisions, the present embodiment may be configured in which no road information is shown in the high-speed run mode or neither the road information nor the map information is shown.

Figure 8:
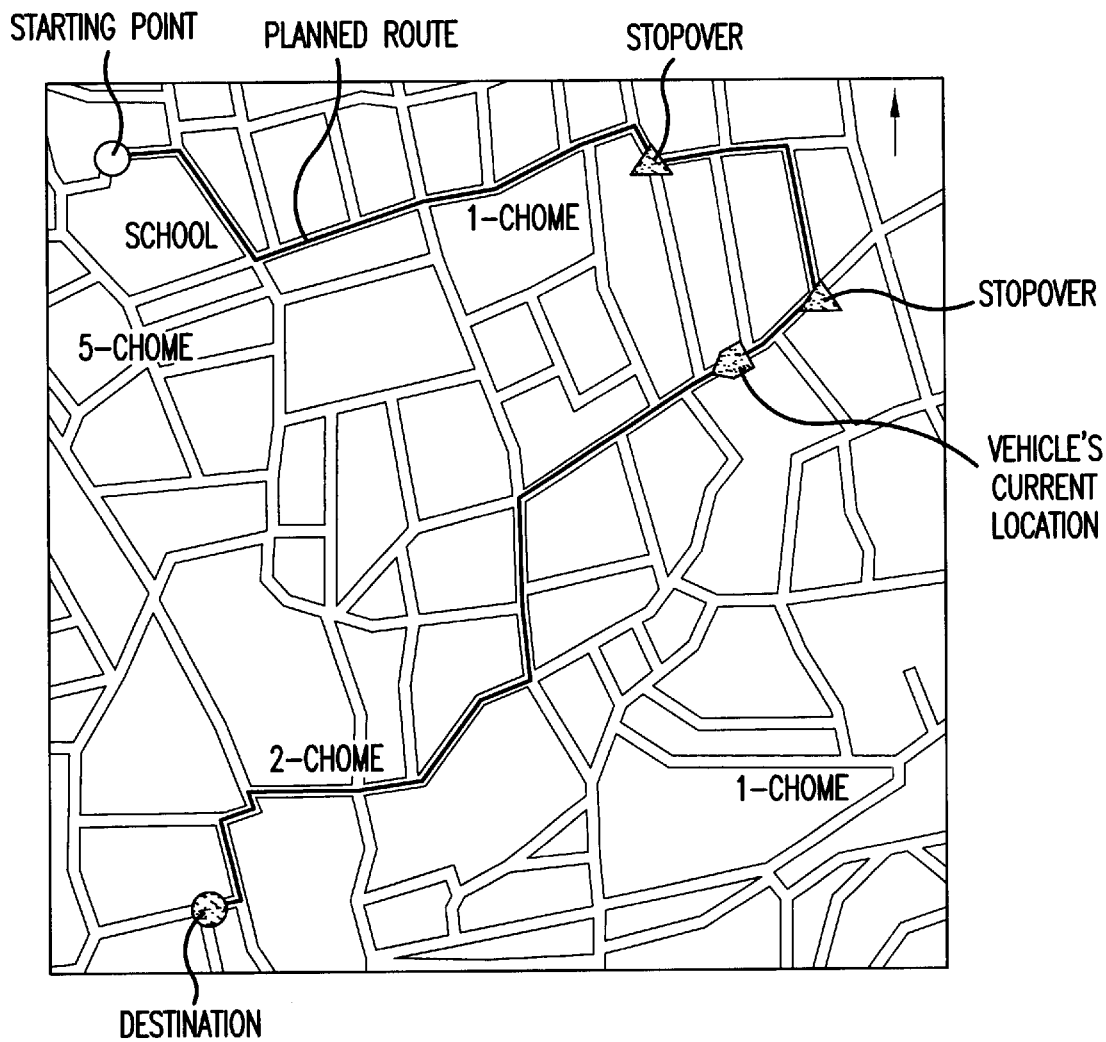
FIG. 8 is a diagram illustrating an example of map information to be displayed in the low-speed run mode.

Referring to FIG. 8, there is shown an example of the above-mentioned map information, road information, planned route information, and vehicle's current location displayed in step S45.

As shown in FIG. 8, the display device 51 shows the map information such as particular symbols representing a school and a post office, the road information indicative of roads, and the vehicle's current location represented by a black pentagonal marker. In addition, the display device 51 shows planned route information including the planned route represented by thick solid lines, the starting point represented by a white circle in the upper left corner, two stopovers represented by black triangles in the upper right corner, and the destination represented by a black circle in the lower left corner. Executing the process of step S45 shown in FIG. 6 shows these pieces of information on the display device 51 in the low-speed run mode of the vehicle.

Figure 9:
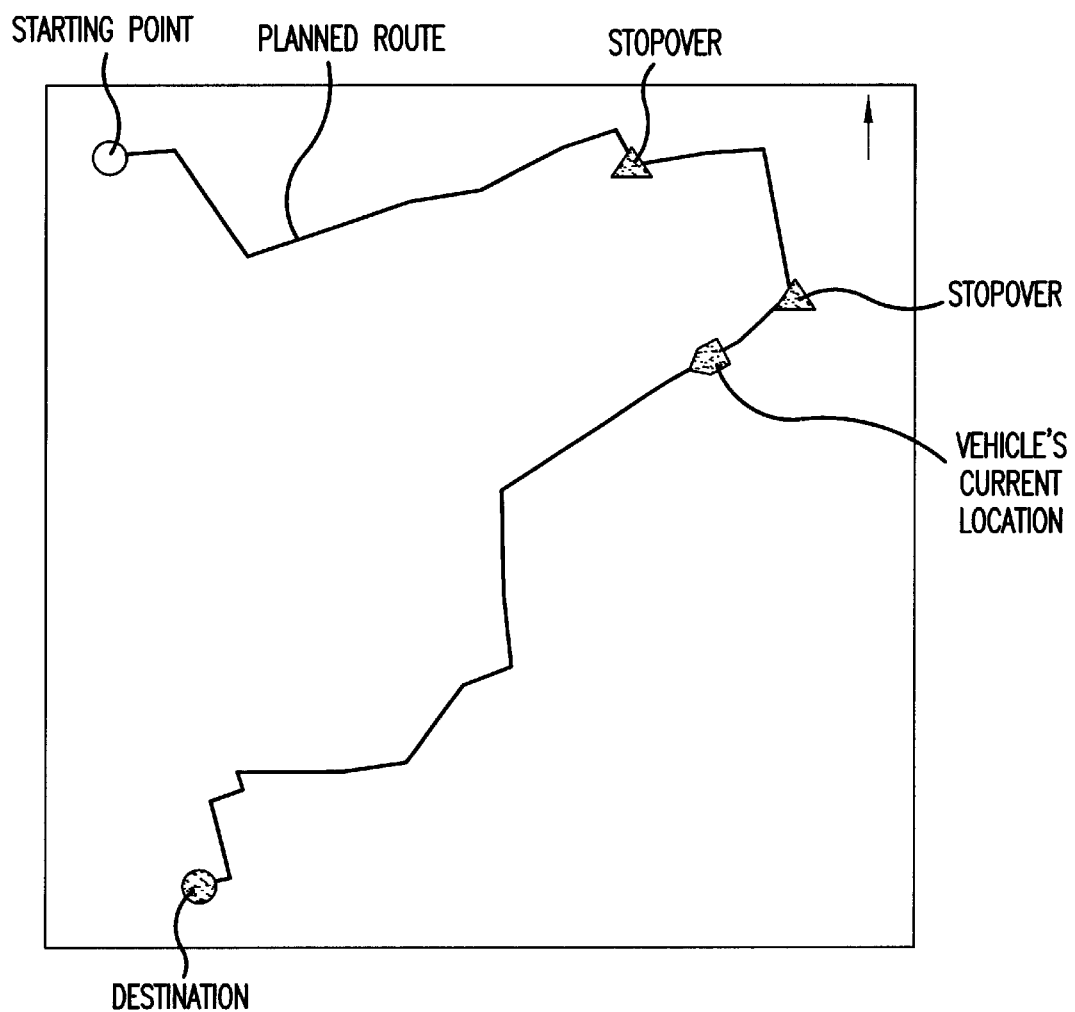
FIG. 9 is a diagram illustrating an example of route information to be displayed in the high-speed run mode.

Referring to FIG. 9, there is shown one example of the display information shown on the display device 51 in the high-speed run mode. Shown in FIG. 9 is the display information to be displayed on the display device 51 if it was determined in step S53 shown in FIG. 7 that the road information is not displayed and if it was determined in step S57 that the map information is not displayed. In this case only the vehicle's current location represented by a black pentagonal marker and the planned route information such as the planned route and destination are displayed on the display device 51 as shown in FIG. 9.

Figure 10:
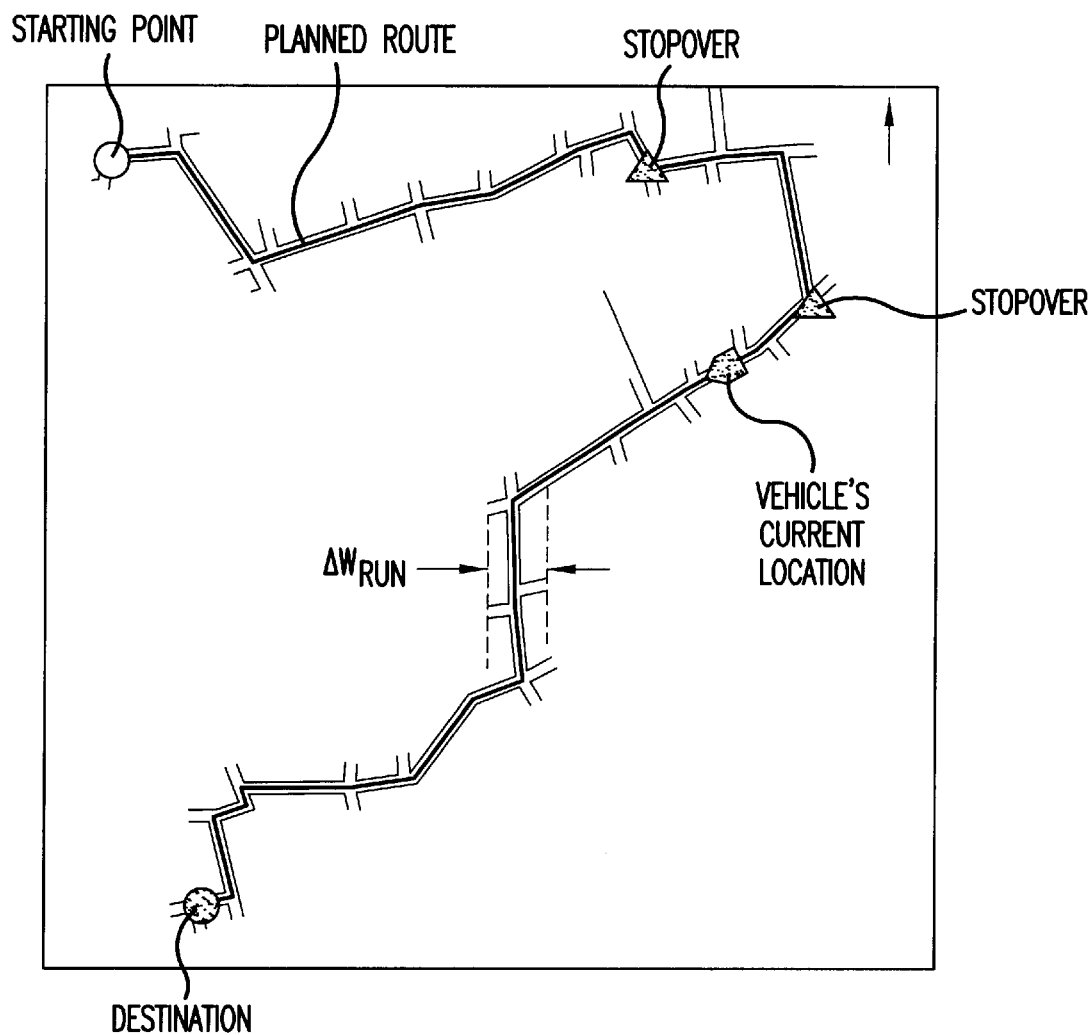
FIG. 10 is a diagram illustrating an example of route information and road information to be displayed in the high-speed run mode.

Referring to FIG. 10, there is shown a second example of the display information to be shown on the display device 51 in the high-speed run mode. Shown in FIG. 10 is the display information to be displayed on the display device 51 when both the vehicle's current location and the planned route information are to be displayed in the high-speed run mode, namely if it was determined in step S53 shown in FIG. 7 that the road information is to be displayed and if it was determined in step S57 that the map information is not to be displayed. As shown in FIG. 10, the vehicle's current location represented by a black pentagonal marker and the planned route information including the planned route and the destination are shown. In addition, the road information along the planned route having an area width $\Delta W_{RUN}$ is displayed on the display device 51. As shown in FIG. 10, showing the road information attached with the area width $\Delta W_{RUN}$ allows the displaying of the positional information about intersections.

Figure 11:
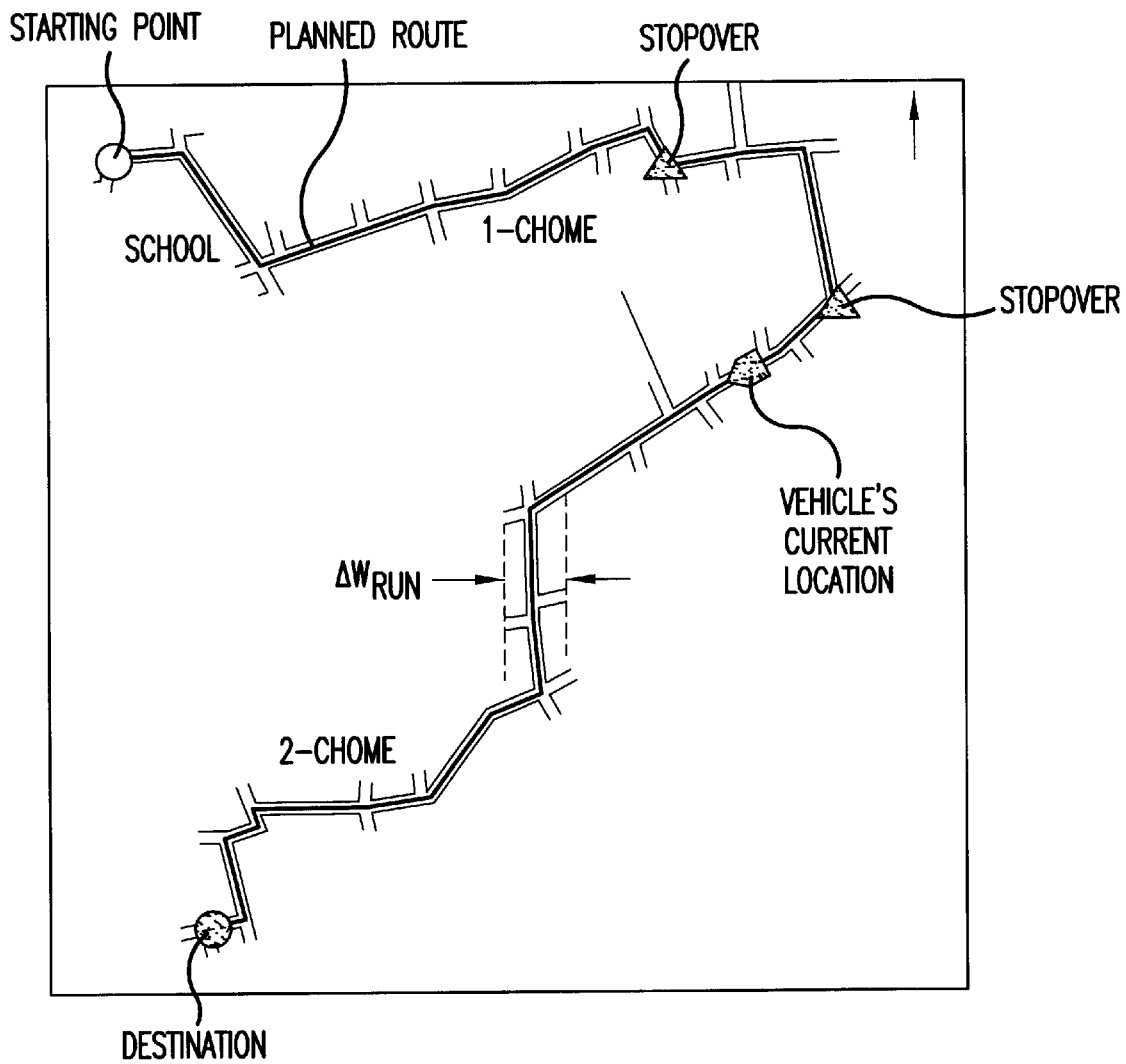
FIG. 11 is a diagram illustrating an example of route information, road information, and map information to be displayed in the high-speed run mode.

Referring to FIG. 11, there is shown a third example of the display information to be displayed on the display device 51 in the high-speed run mode. Shown in FIG. 10 is the display information to be displayed on the display device 51 when the vehicle's current location, the planned route information, the road information, and the map information are to be displayed in the high-speed run mode, namely if it was determined in step S53 shown in FIG. 7 that the road information is to be displayed and if it was determined in step S57 that the map information is to be displayed. As shown in FIG. 10, showing the map information such as place names and facilities in an area width $\Delta W_{RUN}$, along the planned route allows the showing of display information more detailed that those shown in FIGS. 9 and 10.

As shown in FIGS. 8, 9, 10, and 11, all of the above-mentioned information is displayed in the low-speed run mode and only the information required by the driver is displayed in the high-speed run mode. Consequently, the driver can get the appropriate information in accordance with the running states of the vehicle.

In the above-mentioned examples, the road information on the area width $\Delta W_{RUN}$ along the planned route is displayed in the high-speed run mode. It is also practicable to show only main roads such as national roads and express highways.

In the case where a vehicle's current location is corrected by providing consistency between the vehicle current positional information obtained from the sensors and the road information, namely so-called map matching is executed, the vehicle's current location can be corrected quickly and easily by executing map matching only on the road information about the planned road shown on the display device.

In the above-mentioned first embodiment, the map information is read for display from a recording medium such as CD-ROM or DVD as shown in FIG. 2. It will be apparent to those skilled in the art that the map information about predetermined areas may be stored in the auxiliary storage device, an IC card which is the auxiliary storage device 38 shown in FIG. 1 for example and the map information is read therefrom. It should be noted that, if the storage space of an internal memory of the apparatus, the RAM 37 shown in FIG. 1 for example, is larger than the size of the map information to be stored, the map information may be stored in the internal memory. In this case, it is desirable for the auxiliary memory or the internal memory to be a nonvolatile memory such as a nonvolatile RAM, which retains its content even after its power is turned off. The following describes an example in which the map information is stored in the auxiliary memory or the internal memory beforehand and is displayed as read therefrom.

Figure 12:
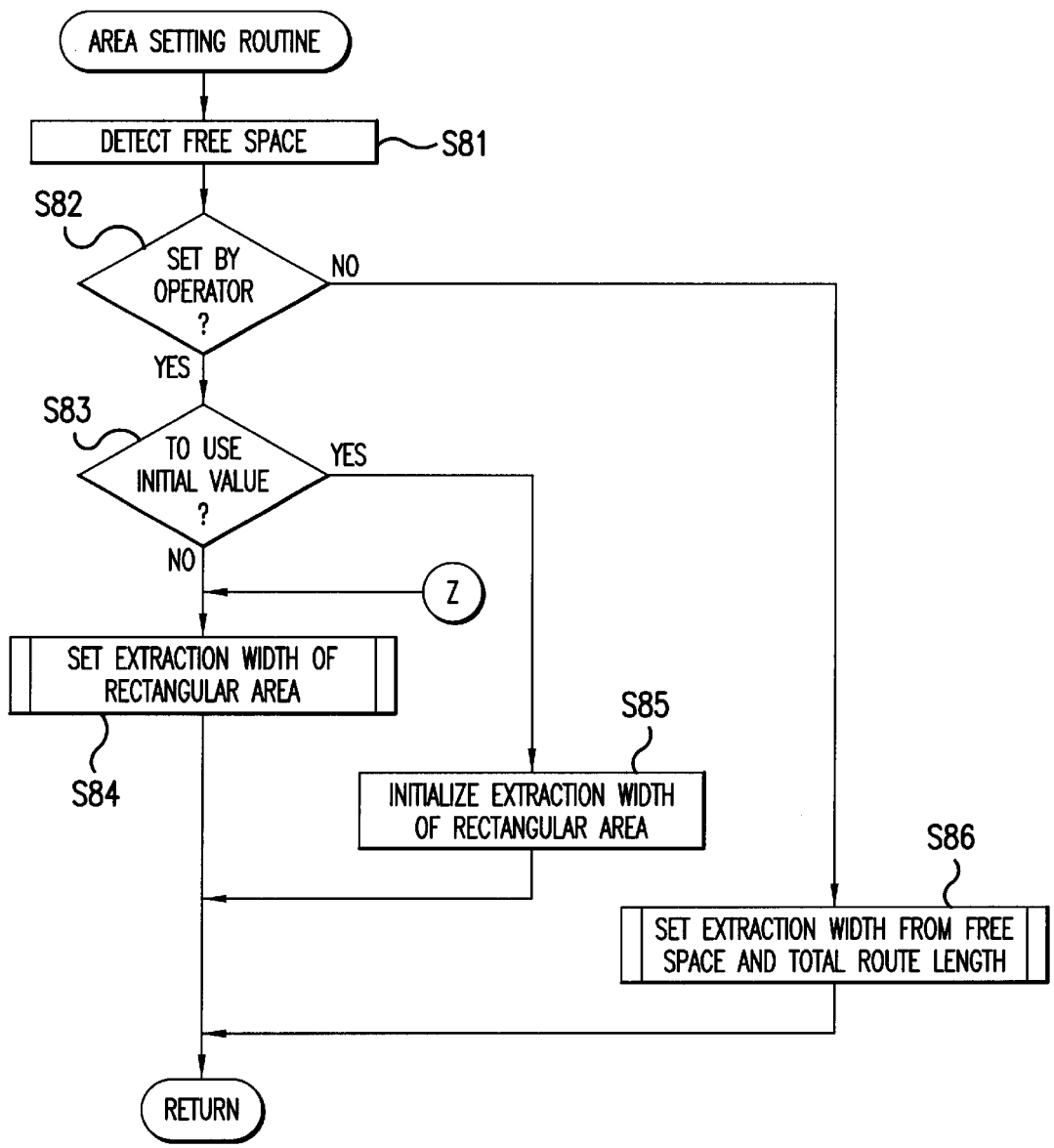
FIG. 12 is a flowchart of a subroutine for generating rectangular area map information.

Referring to FIG. 12, there is a subroutine for setting a rectangular area when the map information to be stored in memory is the map information corresponding to the rectangular area. It should be noted that this subroutine is called for execution after the process of step S23 of the subroutine shown in FIG. 4 for example.

First, the free storage space of the auxiliary storage device 38 is detected (step S81). This detection allows the generation of the map information in accordance with the storage space if a detachable memory, an IC card for example, is loaded in the auxiliary storage device 38 and the loaded memory has a storage size different from those of other IC cards.

Next, a prompt is shown on the display device 51 asking the driver to determine whether to set the extraction width of a rectangular area (step S82). If the driver sets the extraction width, a message is shown on the display device 51 asking whether the driver will use an initial value or not; if an initial value is to be used, a prompt asks the user to input the initial value (step S83). AS an example, this initial value is entered as 4 km, which is stored in the ROM 36 in advance.

Figure 13:
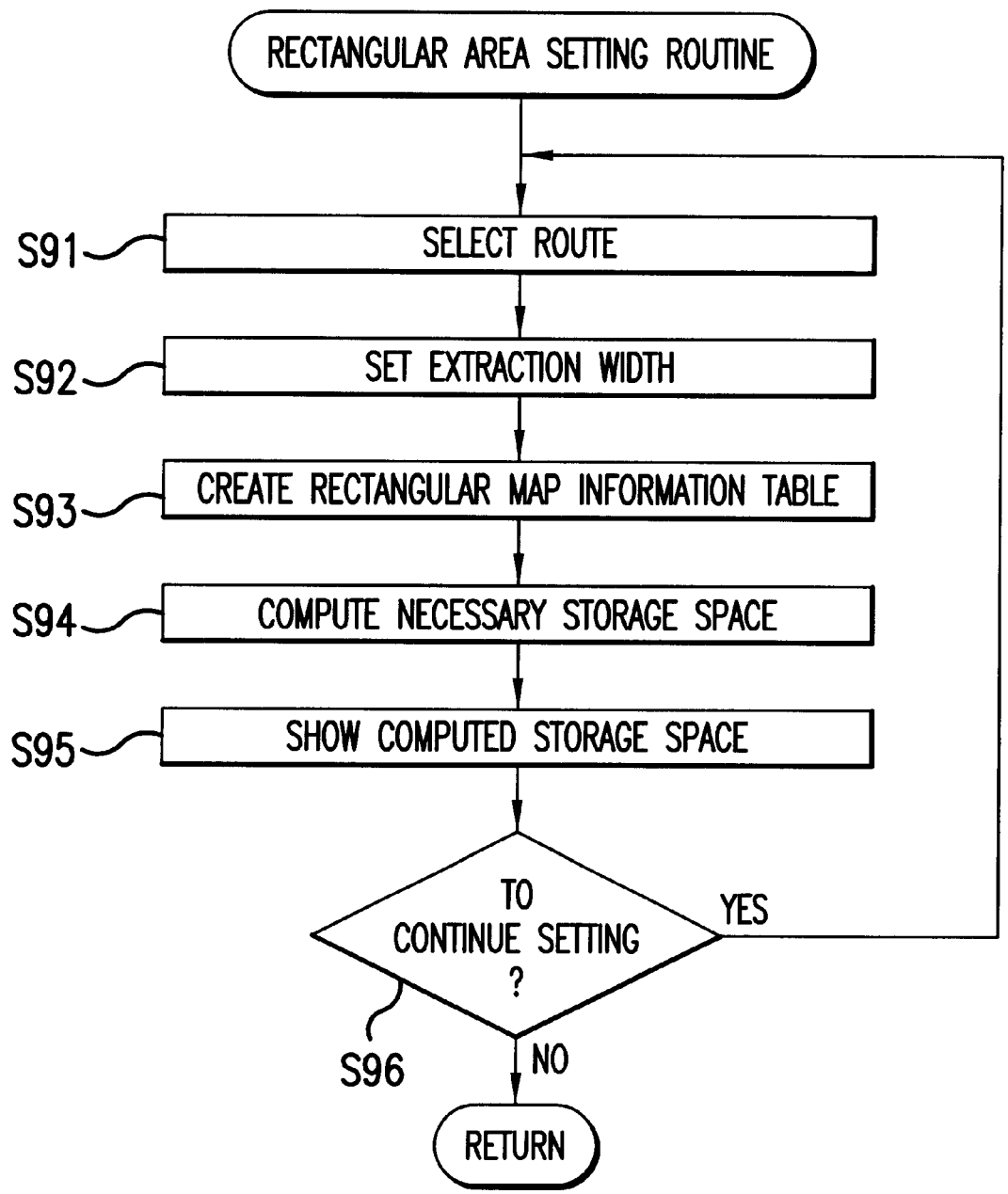
FIG. 13 is a flowchart of a subroutine for setting a rectangular area to be executed in step S84 of FIG. 12.

If the driver selects no use of the initial value, a rectangular area setting subroutine to be described later with reference to FIG. 13 is called and executed to set the extraction width of the rectangular area, upon which this subroutine comes to an end.

If the driver selects the use of the initial value in step S83, the initial value is read from the ROM 36 and the extraction width is set to the initial value (step S85), upon which this subroutine comes to an end.

Figure 14:
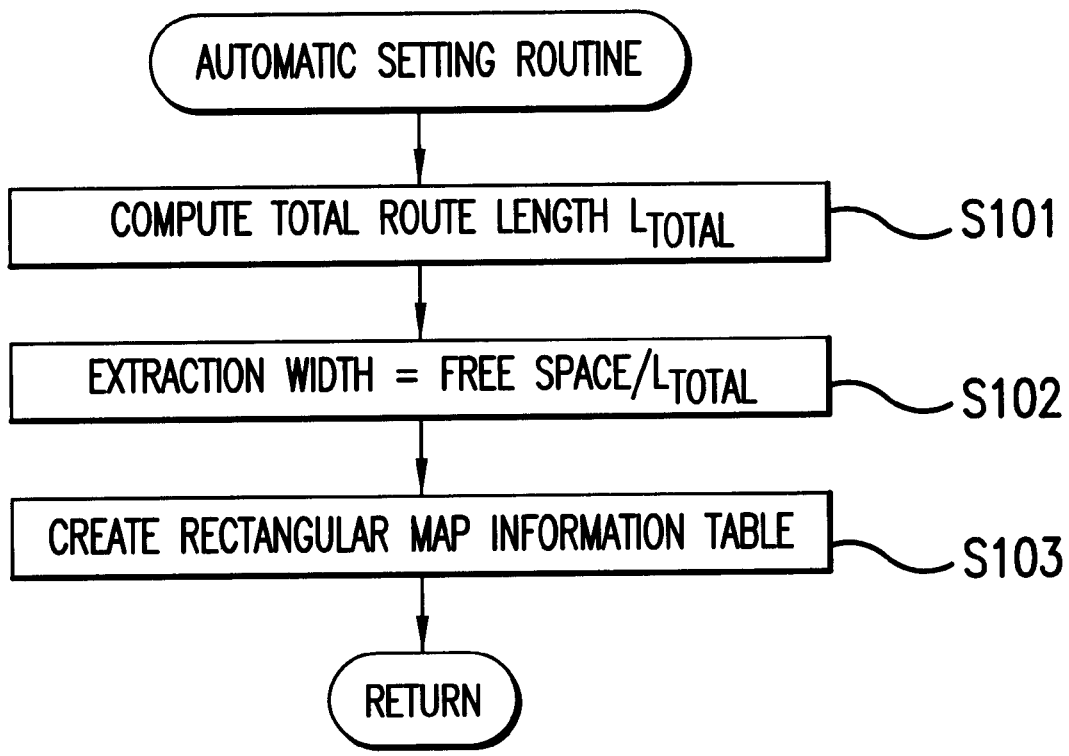
FIG. 14 is a flowchart of a subroutine for setting a rectangular area on the basis of free storage space and total route length to be executed in step S86 of FIG. 12.

If the driver does not select the setting of the extraction width of the rectangular area in step S82, an automatic setting routine to be described with reference to FIG. 14 is called and executed (step S86), upon which this subroutine comes to an end.

Referring to FIG. 13, there is shown the subroutine for setting the extraction width of the rectangular area. As described, this subroutine is called and executed in step S84 shown in FIG. 12.

First, the driver inputs values 1 through n−1 indicative of route $r_i$ (i=1, ... (omitted) ..., n−1), by operating the ten keys on the input device 22 to select a route to which an extraction width is set (step S91). It should be noted that two or more routes may be selected in this route selection. Next, in order to set the extraction width of the selected route, the driver inputs the extraction width in units of kilometers by operating the ten keys on the input device 22 (step S92). In this extraction width setting, a map may be shown on the display device 51 in a superimposed manner and the extraction width may be incremented or decremented by operating the select key and the mouse. It should be noted that the extraction width may be set to zero, in which case the map information corresponding to the rectangular area is not extracted; instead, only the road information is extracted. If a road having no branches or a express highway is selected as the route $r_i$, the rectangular area map information is often not required, so that setting the extraction width to zero can reduce the storage size required by the map information to be generated. In what follows, the extraction width of route $r_i$ is referred to as $\Delta w_1$, the extraction width of route $r_{n-1}$ as $\Delta w_{n-1}$. Namely, the extraction width of each of routes $r_i$ is referred to as $\Delta w_i$ (i=1, ... (omitted) ..., n−1).

Next, from the settings inputted above, a rectangular area map information table as shown in FIG. 15 is generated in the RAM 37 (step S93). FIG. 15 shows planned routes $r_i$ (i=1, ... (omitted) ..., n−1) in the first column, section distances $L_i$ (i=1, ... (omitted) ..., n−1) corresponding to the routes $r_i$ in the second column, extraction widths $\Delta w_i$ (i=1, ... (omitted) ..., n−1) corresponding to the routes $r_i$ in the third column, and necessary storage capacities $L_i \times \Delta w_i$ (i=1, ... (omitted) ..., n−1) obtained by multiplying section distance $L_i$ by extraction width $\Delta w_i$ corresponding to the route $r_i$, in the fourth column. It should be noted that the section distance is obtained from the road information included in the map information. The size of the map information is determined by the dimension of the area concerned. Computing the area dimension can obtain the storage space necessary for the map information to be generated. The storage space necessary for the rectangular area map information can be obtained by computing a sum of the necessary storage capacities listed in the fourth column of FIG. 15.

From the rectangular area map information table generated in step S93, a sum of the necessary storage capacities in the current settings is computed (step S94) and a result of this computation is shown on the display device 51 (step S95). This display includes the total storage size of the memory loaded in the auxiliary storage device 38, the necessary storage space at the current point of time, the free storage space at the current point of time, and the ratio between the total storage space and the current free storage space, in the screen of the display device 51. Showing these kinds of information on the display device 51 allows the driver to know if the size of the map information is appropriate or not also during the setting operation.

Next, a prompt is shown on the display device 51 for the driver to continue the setting operation (step S96). To continue the setting operation, the subroutine returns to step S91 in which the driver enters settings. If the setting operation is no longer required, this subroutine comes to an end.

As described, the necessary storage space and the free storage space can be shown during inputting settings such as extraction widths and the setting can be changed halfway in the setting operation. Consequently, if the driver determines that the size of the map information corresponding to a rectangular area is not appropriate for the driver, if the size shown is unexpectedly large for example, the driver can quickly modify the settings.

Referring to FIG. 14, there is shown a subroutine for computing the extraction width of a rectangular area from free storage space, total route length, and total number of location points. It should be noted that this subroutine is called and executed in step S86 of the subroutine shown in FIG. 12 as described above.

First, total route length $L_{TOTAL}$ is computed from the road information (step S101). It should be noted that this total route length $L_{TOTAL}$ is equal to a sum of section distances $L_i$ (i=1, ... (omitted) ..., n−1) listed in the second column of FIG. 15.

Next, an amount obtained by dividing the free storage space of the auxiliary storage device 38 detected in step S81 of FIG. 12 by the total route length $L_{TOTAL}$ is used as the extraction width of the rectangular area (step S102). Then, as with step S94 shown in FIG. 13, a rectangular map information table as shown in FIG. 15 is generated (step S103), upon which this subroutine comes to an end.

It should be noted that, in the above-mentioned subroutine, the rectangular area map information is generated with the extraction width of the rectangular area being unchanged over the entire displayed route. Namely, in the above-mentioned subroutine, the rectangular area map information is generated with the rectangular area map information table shown in FIG. 15 as $\Delta w_1 = \ldots$ (omitted) $\ldots = \Delta w_i = \ldots$ (omitted) $\ldots, \Delta w_{n-1}$. It is also practicable that the rectangular area map information is generated with the extraction width of each rectangular area variable.

Figure 16:
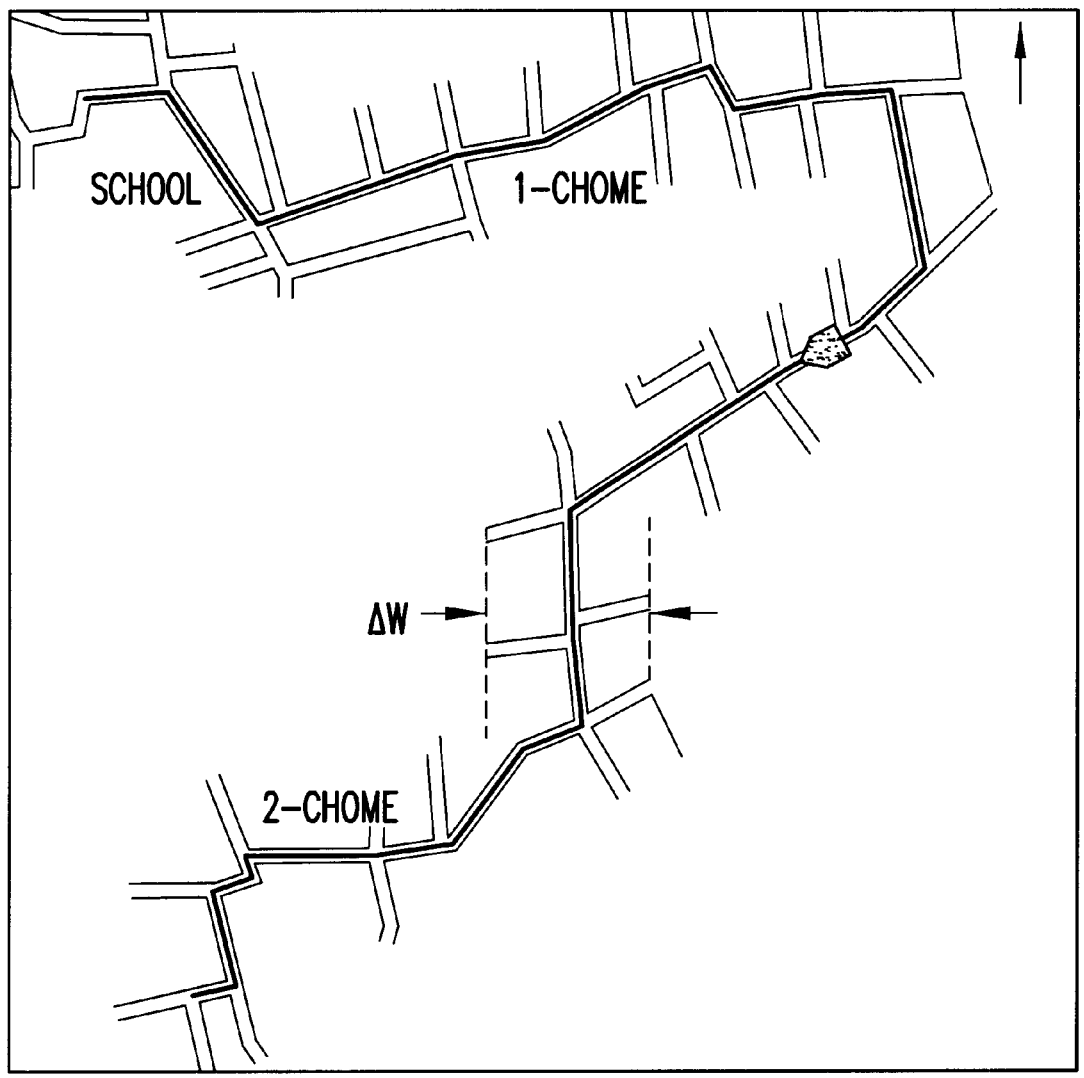
FIG. 16 is a diagram illustrating an example of route information, road information, and rectangular area map information to be generated by the subroutine shown in FIG. 12 and displayed in the high-speed run mode.

Referring to FIG. 16, there is shown one example of the rectangular area map information generated by the above-mentioned rectangular area setting routine. It should be noted that the map information corresponding to the various kinds of map information shown in FIGS. 8 through 11 is denoted by the similar symbols. The rectangular area map information shown in FIG. 16 was generated with the extraction width of each rectangular area being a constant width $\Delta W$. Thus, the map information to be stored in the memory is generated as the rectangular area map information, thereby reducing the storage space necessary for storing the generated map information.

As described, if the configuration in which the extracted rectangular area map information is stored in a memory such as an auxiliary storage device beforehand is used, the rectangular area map information with width $\Delta W$ as shown in FIG. 16 is read from the auxiliary storage device 38 and this rectangular area map information, the planned route information, the road information, and the vehicle's current positional information are shown on the display device 51 in the low-speed run mode; in the high-speed run mode, the display information such as the route information shown in FIG. 9, 10, or 11 is shown, thereby making it unnecessary to read the map information from a storage medium such as CD-ROM.

In the above-mentioned embodiments, the map information is extracted with the shape of each area extending along the planned route being rectangular. It will be apparent to those skilled in the art that a shape other than rectangular may be used as the shape of each area extending along the planned route.

In the first embodiment described with reference to FIGS. 2 through 11, the map information is read from a storage medium such as CD-ROM or the RAM 37 and, every time the map information is read, the rectangular area map information with area width $\Delta W_{RUN}$ is generated as the map information to be shown in the high-speed run mode. It is also possible, in the first embodiment, to generate the rectangular area map information with area width $\Delta W_{RUN}$ by executing the subroutines shown in FIGS. 12 through 14 and store the generated information in the auxiliary storage device 38 in advance. In this case, when displaying the map information in the high-speed run mode, namely when displaying the map information in step S59 of FIG. 7, the rectangular area map information with area width $\Delta W_{RUN}$ may be read from the auxiliary storage device 38 to be shown on the display device 51.

Figure 17:
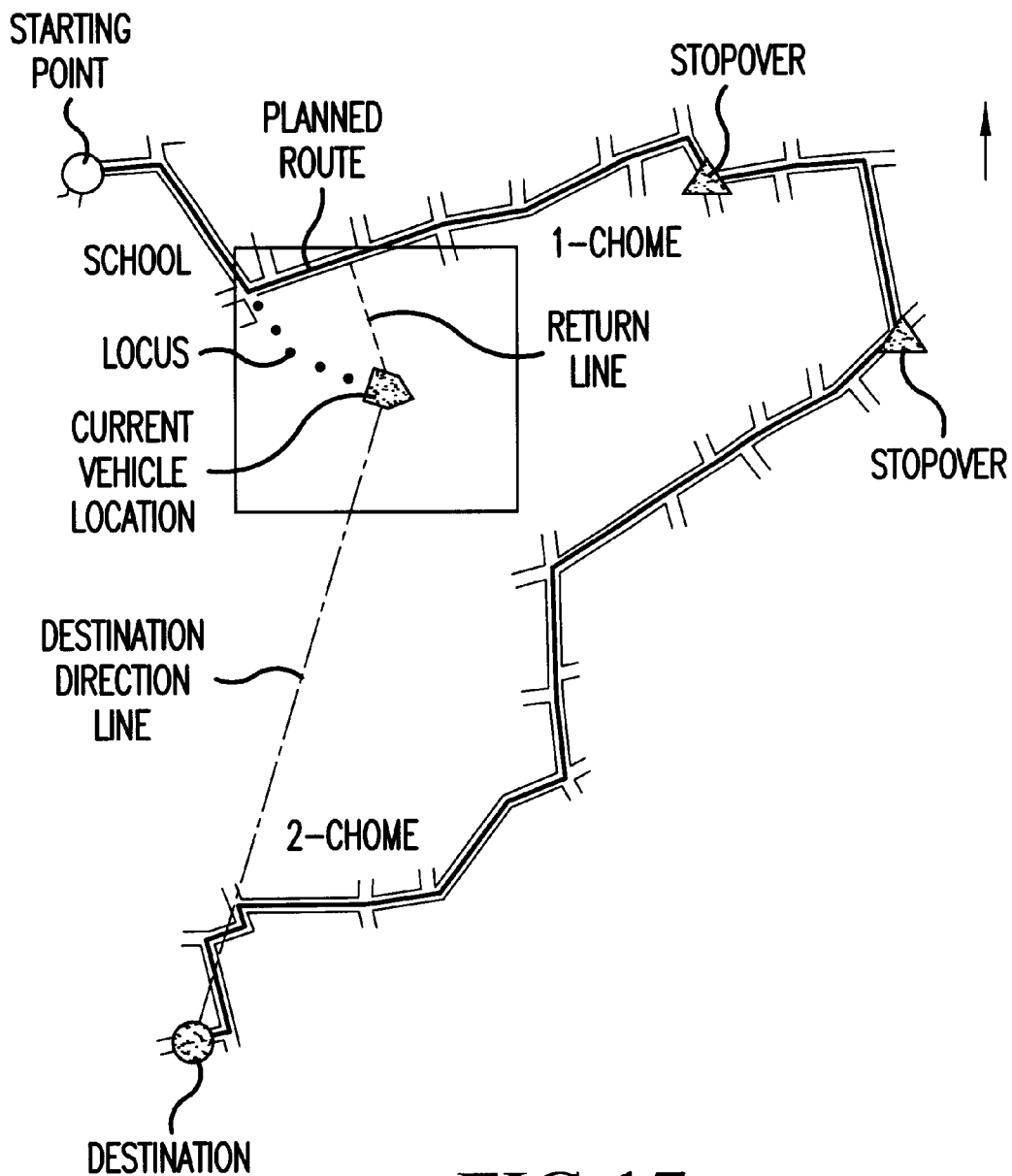
FIG. 17 is a diagram illustrating an example to be displayed when the vehicle deviates from the planned route.
Figure 18:
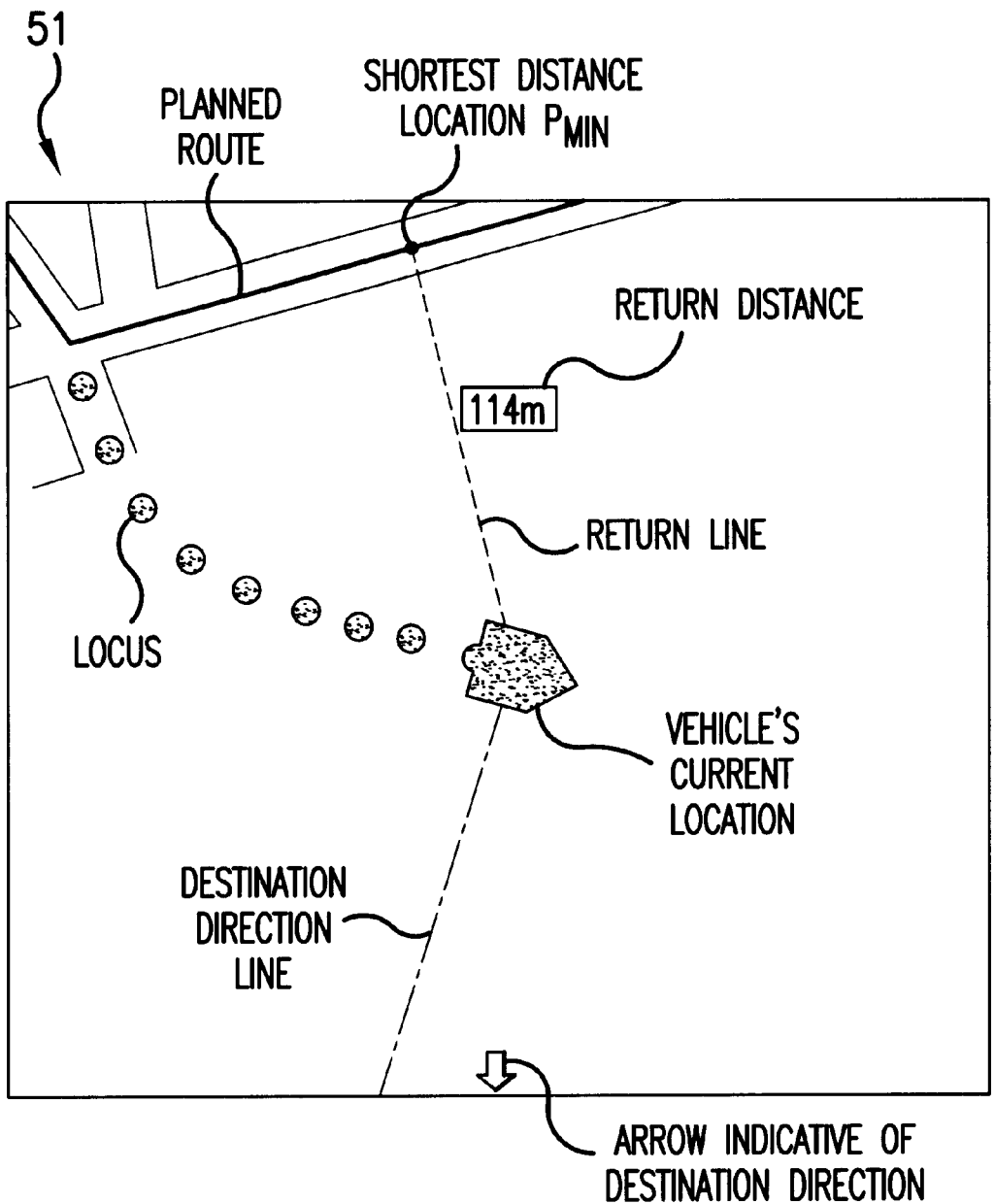
FIG. 18 is a diagram illustrating an enlargement of an area indicative by a square in FIG. 17.

FIGS. 17 and 18 illustrate examples of the display information such as the map information to be shown on the display device 51 when the vehicle deviates from the planned route. FIG. 17 depicts the planned route in its entirety, in which the information in a square area is shown on the display device 51. FIG. 18 depicts an enlargement of the square area shown in FIG. 17.

In FIGS. 17 and 18, black pentagonal markers denote the vehicle's current location and black dots denote a locus of the vehicle. A dashed line and a phantom line denote a return line and a destination direction line respectively to be described later.

The return line indicates a location on the planned route at which the straight line distance from the vehicle's current location to the planned route is the shortest (this location is hereinafter referred to as a shortest distance location). In FIG. 18, the shortest distance location is denoted by $P_{MIN}$. The destination direction line is a straight line from the vehicle's current location to the destination.

Figure 19:
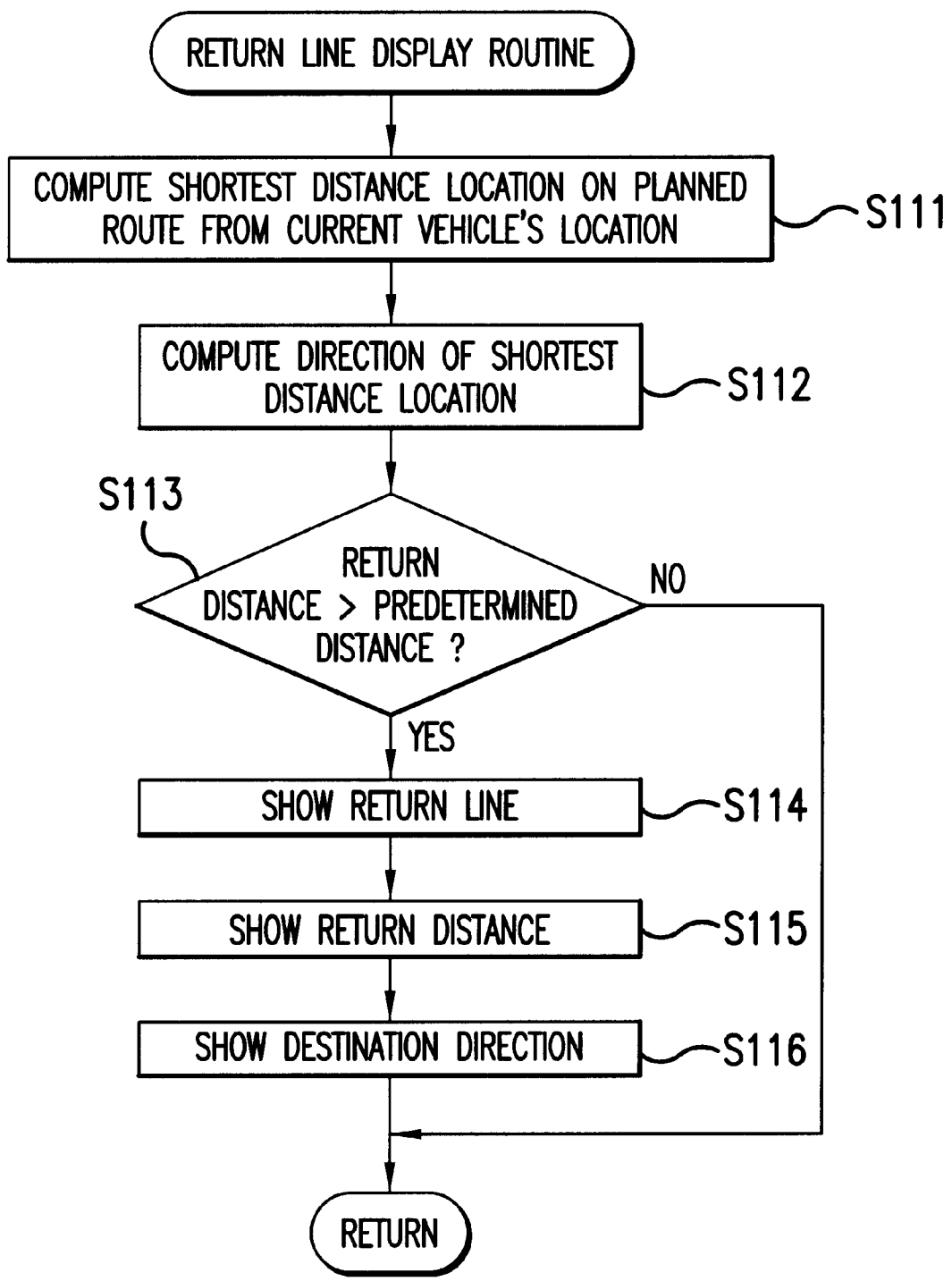
FIG. 19 is a flowchart of a subroutine for displaying a return line.

Referring to FIG. 19, there is shown a subroutine for displaying the above-mentioned return line.

First, the above-mentioned shortest distance location $P_{MIN}$ is computed from the vehicle's current positional data and the planned route information (step S1). In what follows, the straight line from the vehicle's current location to the shortest distance location $P_{MIN}$ is referred to as a return distance. Next, the direction of the shortest distance location $P_{MIN}$ viewed from the vehicle's current location is computed (step S112). Then, it is determined whether the return distance is greater than or equal to a predetermined distance (step S113). This predetermined distance may be a default value, 50 meters for example, or may be changed in accordance with the reduction scale level for showing the map information on the display device 51.

If the return distance is found less than the predetermined distance in step S113, the subroutine ends immediately. If the return distance is found greater than or equal to the predetermined distance, the return line is shown on the display device 51 (step S114). As described, in the example shown in FIG. 18, the dashed line from the vehicle's current location to the shortest distance location $P_{MIN}$ is the return line. It should be noted that, in this example, the return line is directed approximately vertical to the planned route. Next, the return distance is shown at a predetermined location on the display device 51, in the vicinity of the return line for example, (step S115), then the direction of the destination as viewed from the vehicle's current location is computed and an arrow marker indicative of the destination is shown in the vicinity of one end side of the display device 51 (step S116), upon which this subroutine comes to an end. In the example shown in FIG. 18, "114 m" shown besides the return line is the return distance. In FIG. 18, the arrow marker pointing at the destination is a hollow arrow shown at lower center. This hollow arrow points at the approximate direction of the destination and is shown in one of end sides of or in a square in the display device 51. For example, if the hollow arrow is shown in the location of one of the 8 cardinal points. In this example, the display has 8 cardinal points, namely upper center, lower center, right center, left center, upper right, upper left, lower right, and lower left. More or less cardinal points may also be used if desired. In accordance with the direction of the destination, the hollow arrow is shown accordingly. In this configuration, in the S116, the direction of the destination viewed from the vehicle's current location is computed and the hollow arrow nearest to the computed direction is selectively displayed. In the example shown in FIG. 18, the direction of the destination indicated by the destination direction line is approximately south-southwest, the hollow arrow in the lower center is selected and displayed on the display device 51.

Figure 20:
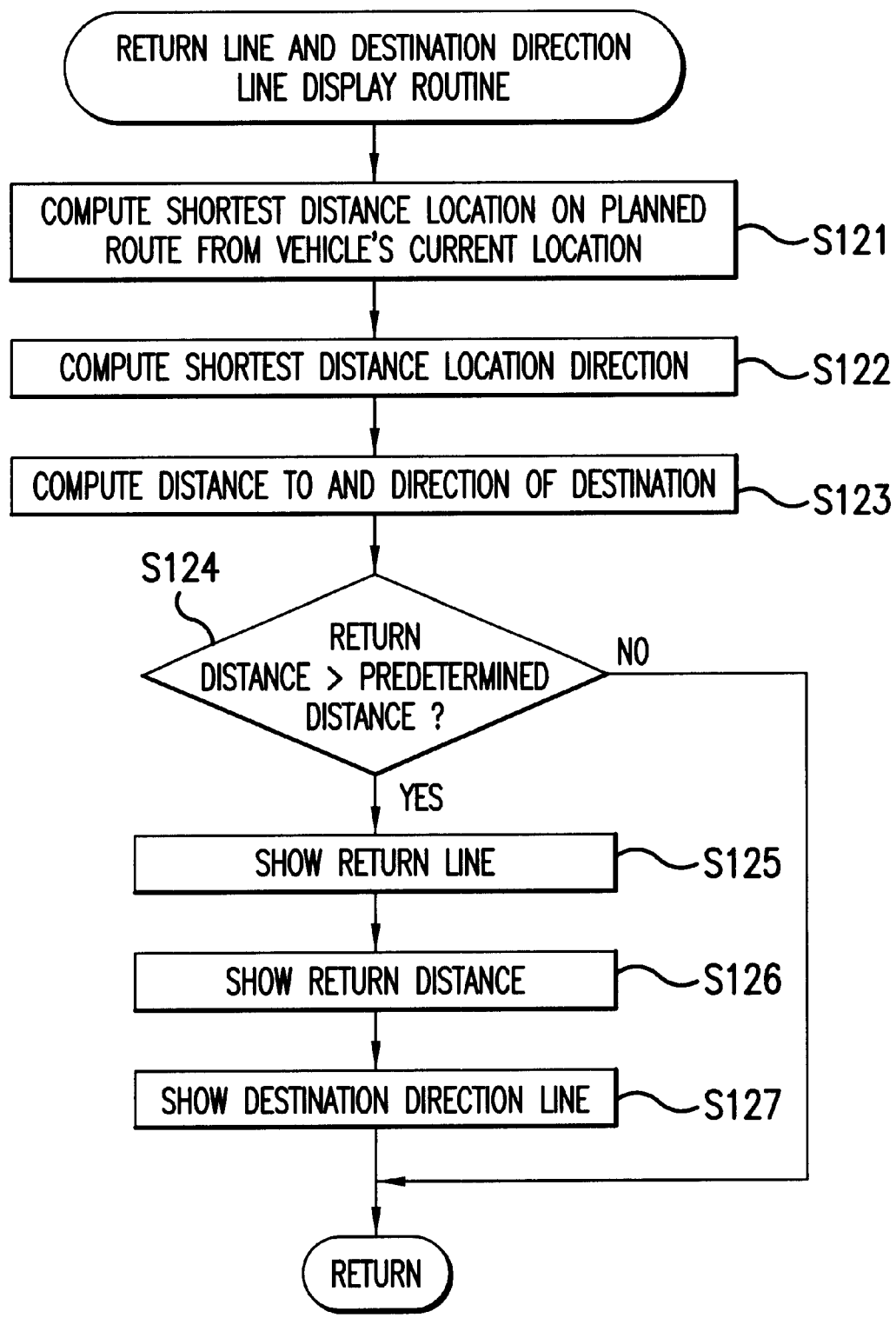
FIG. 20 is a flowchart of a subroutine for displaying a return line and a destination direction line.

Referring to FIG. 20, there is shown a subroutine for displaying the return line and the destination direction line.

First, like the subroutine shown in FIG. 19, a shortest distance location $P_{MIN}$ is computed (step S121) and then the direction of the shortest distance location $P_{MIN}$ is computed (step S122). Next, the distance to and the direction of the destination from the vehicle's current location are computed (step S123) and it is determined whether the return distance is greater than or equal to a predetermined distance (step S124). It should be noted that this predetermined distance may be a default value or variable in accordance with the reduction scale used If the return distance is found less than the predetermined distance in step S124, this subroutine immediately comes to an end. If the return distance is found greater than or equal to the predetermined distance, the return line is shown on the display device 51 (step S125) and the return distance is shown at a predetermined location on the display device 51 (step S126). Next, a destination direction line is shown on the display device 51 from the direction to the destination computed in step S123, upon which this subroutine comes to an end. It should be noted that, in the example shown in FIG. 18, the line indicated by a phantom line from the vehicle's current location to the destination represents the destination direction line.

Figure 21:
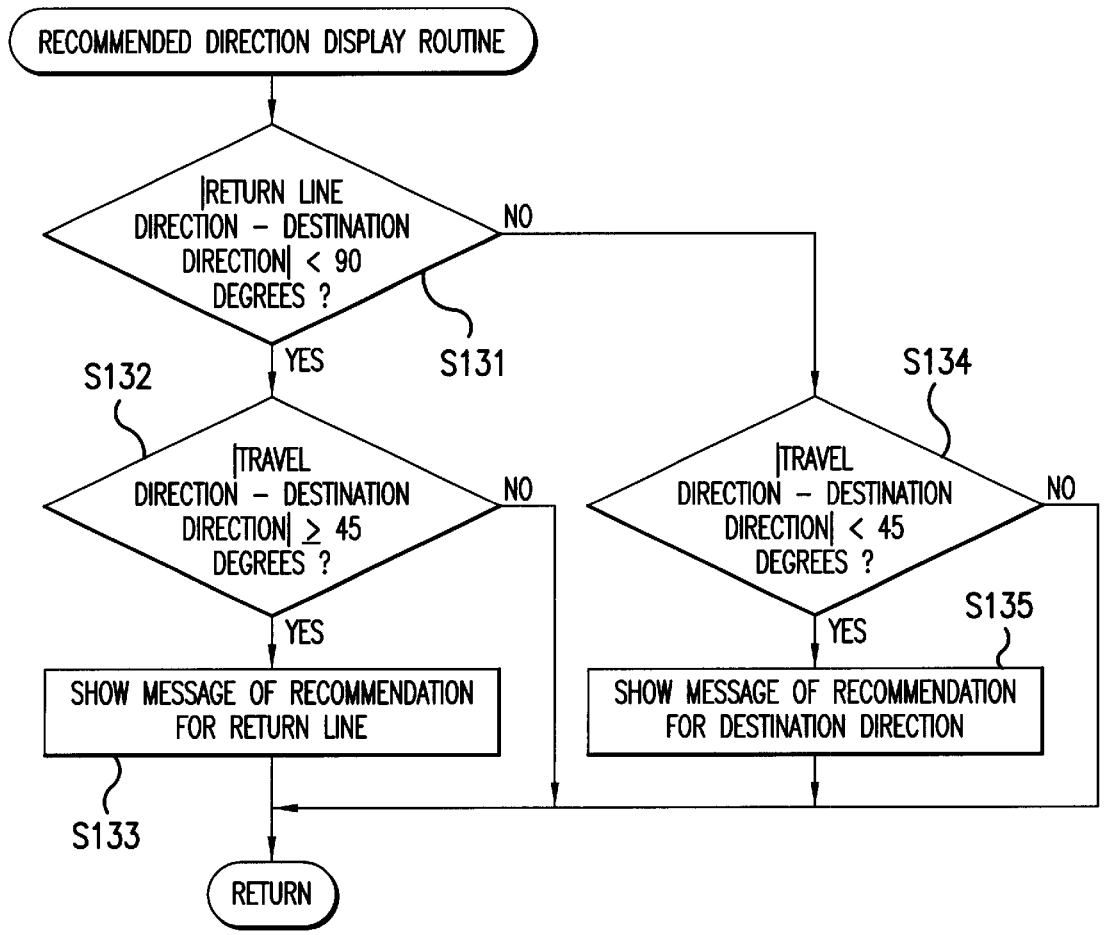
FIG. 21 is a flowchart of a subroutine for determining a recommended travel direction.

Referring to FIG. 21, there is shown a subroutine for determining a recommended travel direction.

First, an angle is computed between the return line and the destination direction line from the return line direction and the destination direction line obtained by executing the subroutine shown in FIG. 19 or 20 and it is determined if the obtained angle is less than 90 degrees or not (step S131). If the angle is found less than 90 degrees, an angle is computed between a travel direction line extending in parallel to the vehicle's travel direction and the destination direction line from the vehicle's travel direction and the destination direction and it is determined whether the obtained angle is greater than or equal to 45 degrees or not (step S132). If the angle is found greater than or equal to 45 degrees, a message is shown on the display device 51 indicating that the vehicle should travel along the return line (step S133), upon which this subroutine comes to an end. If the angle is found less than 45 degrees in step S132, this subroutine immediately comes to an end.

If the angle between the return line and the destination direction line is found greater than or equal to 90 degrees in step S131, it is determined whether an angle between the travel direction line and the destination direction line is less than 45 degrees or not (step S134). If the angle between the travel direction line and the destination direction line is found less than 45 degrees, a message is shown on the display device 51 indicating that the vehicle should travel along the destination direction (step S135), upon which this subroutine comes to an end. If the angle between the travel direction line and the destination direction line is found greater than or equal to 45 degrees in step S134, this subroutine immediately comes to an end.

In the subroutine shown in FIG. 21, the recommended travel direction is determined from the return line direction, the destination direction, and the vehicle's travel direction. It will be apparent to those skilled in the art that the distance from the vehicle's current location to the destination and the return distance may be added to the conditions for this determination.

FIG. 22 shows examples in which it is better to navigate the vehicle in the direction of the return line and in the direction of the destination. In these examples, the planned route is represented by thick solid lines, the destination by a large black circle, the vehicle's current location by a black pentagonal marker, and the locus traveled by the vehicle by black dots. The return line is represented by a dashed line, the destination direction line by a phantom line, and the vehicle's travel direction by a dashed arrow.

Figure 22A:
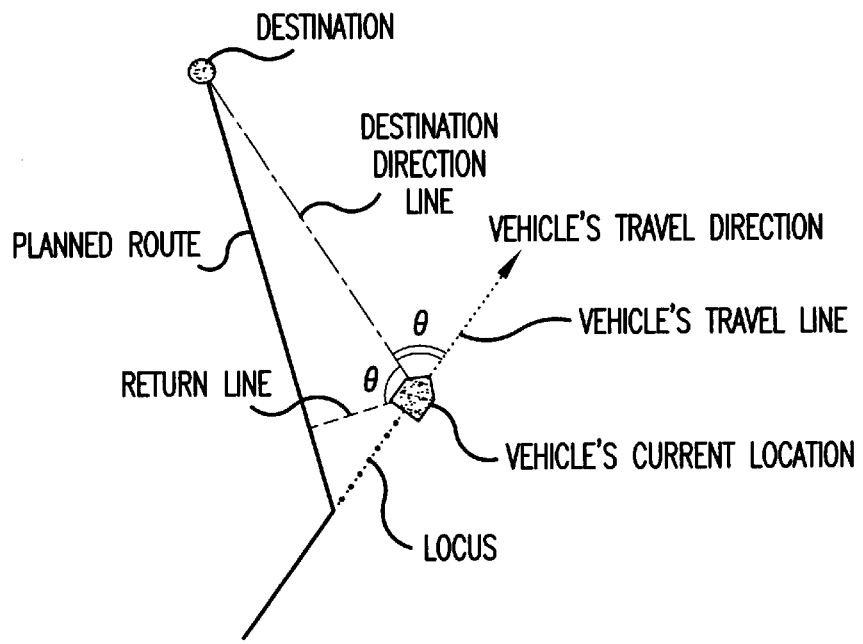
FIGS. 22(*a*) and 22(*b*) are diagrams illustrating examples of navigating the vehicle along the return line and navigating the vehicle along the destination direction line.

As shown in FIG. 22(a), when the vehicle is traveling in the direction away from the destination, angle θ between the return line and the destination direction line is less than 90 degrees. Angle Θ between the vehicle's travel direction line and the destination direction line is greater than or equal to 45 degrees. In this case, navigating the vehicle along the return line makes it easier for the vehicle to return to the planned route.

Figure 22B:
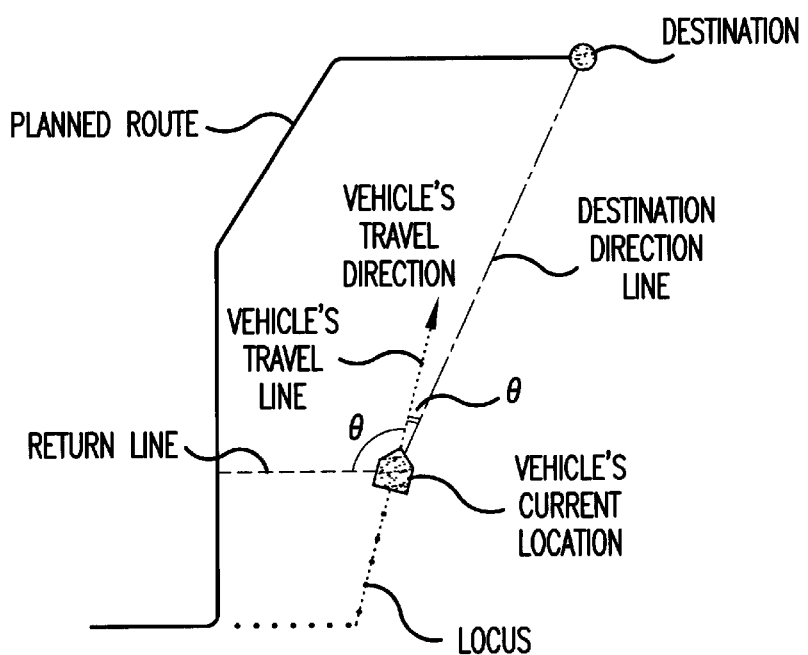

As shown in FIG. 22(b), when the vehicle is traveling toward the destination, angle θ between the return line and the destination direction line is greater than or equal to 90 degrees. Angle Θ between the vehicle's travel direction line and the destination direction line is less than 45 degrees. In this case, navigating the vehicle along the destination direction line makes the vehicle reach the destination without going a long way round.

Referring to FIGS. 23 and 24, there are shown second through sixth embodiments of the invention in which rectangular area map information is generated by executing the subroutines shown in FIGS. 12 through 14, the generated rectangular area map information is stored in an auxiliary memory or an internal memory, and the stored map information is displayed.

Figure 23A:
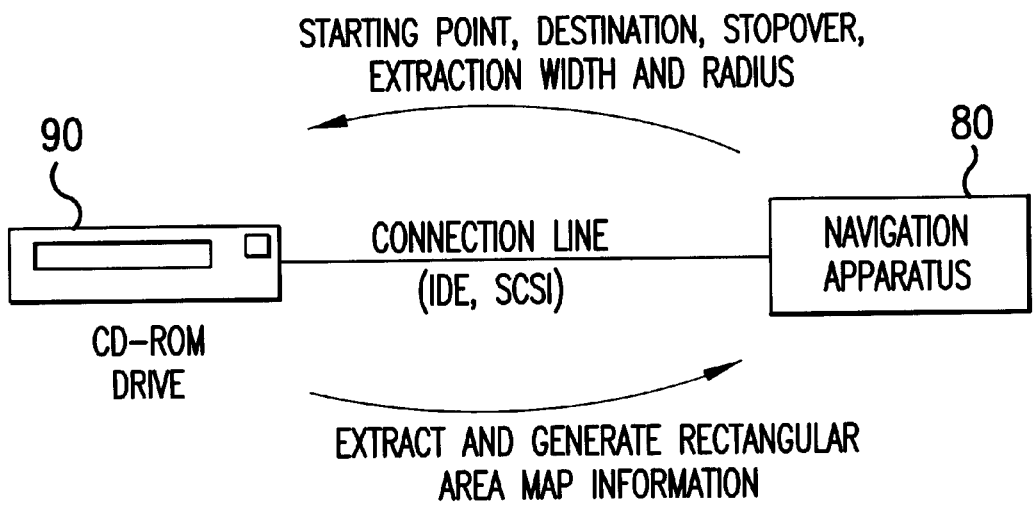
FIGS. 23(a) and 23(b) are schematic diagrams illustrating the second and third embodiments of the present invention.

FIG. 23(a) depicts an in-vehicle navigation apparatus practiced as the second embodiment of the invention. In the second embodiment, the in-vehicle navigation apparatus is a navigation apparatus 80 as shown in FIG. 23(a), which comprises the controller 30, the input device 22, and the display device 51 shown in FIG. 1. To display vehicle's current positional information, the sensors 11 through 15 (not shown) as shown in FIG. 1 are connected to the navigation apparatus 80. In addition, the navigation apparatus 80 has predetermined interface circuits, interface circuits compliant with IDE and SCSI for example, and connectors (not shown) for the connection with external storage devices in order to make connections with an external storage device 90 such as a CD-ROM drive or a DVD drive, which is equivalent to the map information supply device 21 shown in FIG. 1.

The processing for storing the map information generated in correspondence with a rectangular area into the auxiliary storage device 38 is executed in a state in which the external storage device 90 is connected to the navigation apparatus 80 and a recording medium such as a CD-ROM storing the map information is loaded on the external storage device 90. When the driver operates the input device 22 of the navigation apparatus 80, the above-mentioned processing starts, executing the subroutines shown in FIGS. 12 through 14. When these subroutines are executed, the map information corresponding to a predetermined area is read from the recording medium such as a CD-ROM, rectangular area map information is generated in the navigation apparatus 80, and the generated rectangular area map information is stored in the auxiliary storage device 38 of the navigation apparatus 80.

When moving the vehicle with the navigation apparatus 80 on-board, when touring with a motorcycle for example, the external storage device 90 is disconnected from the navigation device 80 and the sensors 11 through 15 such as the GPS are connected to the navigation apparatus 80, thereby displaying the information such as the rectangular area map information and the vehicle's current location while the vehicle is traveling.

Figure 23B:
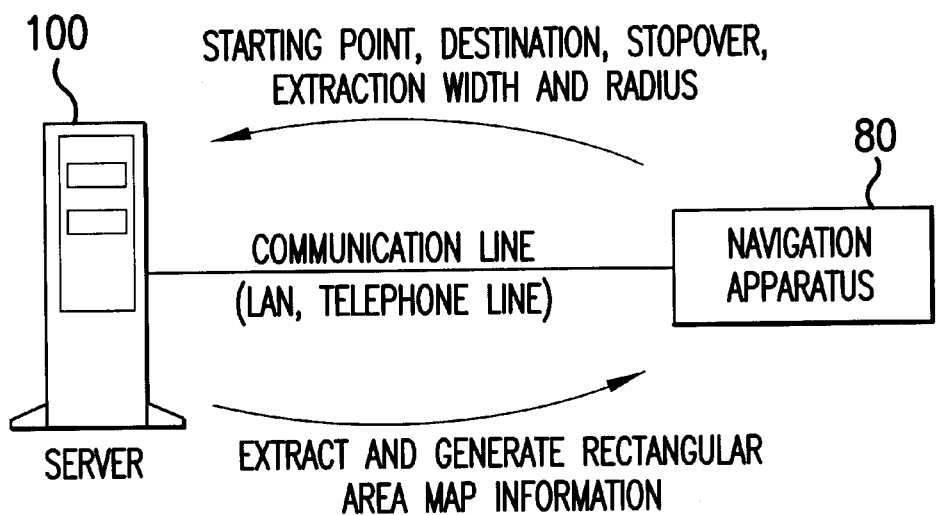

FIG. 23(b) shows an in-vehicle navigation apparatus practiced as the third embodiment of the invention. In the third embodiment, the map information supply device 21 shown in FIG. 1 is equivalent to a server 100 storing map information, a server for providing the map information on the Internet for example. As with the second embodiment, the navigation apparatus 80 comprises the controller 30, the input device 22, and the display device 51 shown in FIG. 1. In addition, the navigation apparatus 80 has a communication interface circuit (not shown) for communicating with the server 100 via a communication line, for example, a local area network (hereafter referred to as a LAN) or a telephone line. When displaying the vehicle's current positional information, the sensors 11 through 15 (not shown) shown in FIG. 1 are connected to the navigation apparatus 80.

In the third embodiment, the subroutines shown in FIGS. 12 through 14 have been executed in advance in another processing apparatus, a personal computer for example (not shown) and the rectangular area map information generated by this execution are stored in the server 100. The processing for storing the generated rectangular area map information into the auxiliary storage device 38 of the navigation apparatus 80 is executed in a state in which the server 100 is connected to the navigation apparatus 80 via the communication line. When the driver operates the input device 22 of the navigation apparatus 80, a predetermined command is issued to the server 100. In accordance with this command, the server 100 is remotely operated to supply the rectangular area map information generated in advance and stored in the server 100 to the navigation apparatus 80. The navigation apparatus 80 stores the supplied rectangular area map information into the auxiliary storage device 38.

When traveling the vehicle with the navigation apparatus 80 on-board, the server 100 is disconnected from the navigation apparatus 80 as with the second embodiment, and the sensors 11 through 15 such as the GPS are connected to the navigation apparatus 80 storing the rectangular area map information, thereby displaying the information such as the rectangular area map information and the vehicle's current location on the navigation apparatus 80 while the vehicle is traveling.

Figure 24A:
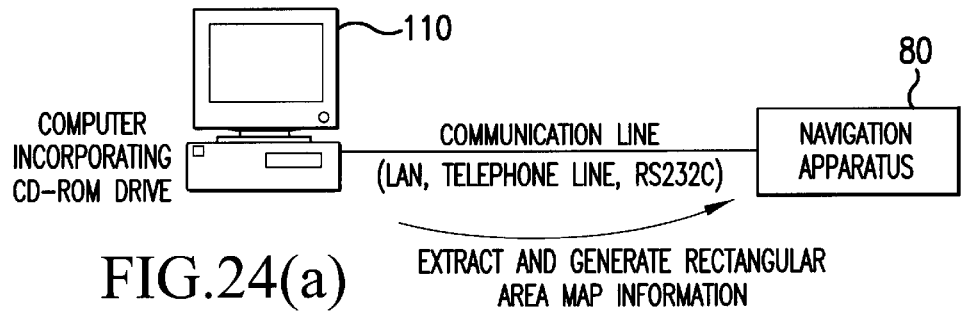
FIGS. 24(a), 24(b) and 24(c) are schematic diagrams illustrating the fourth, fifth, and sixth embodiments of the invention.

FIG. 24(a) depicts an in-vehicle navigation apparatus practiced as the fourth embodiment of the invention. In the fourth embodiment, the map information supply device 21 shown in FIG. 1 is equivalent to a processing device 110 with a CD-ROM drive or a DVD drive incorporated or connected, for example, a personal computer. As with the second and third embodiments, the navigation device 80 comprises the controller 30, the input device 22, and the display device 51 shown in FIG. 1. In addition, for the connection with the processing device 110, the navigation apparatus 80 has a communication interface circuit (not shown) for the communication with a server via a communication line, for example, a LAN or a telephone line. When displaying the vehicle's current positional information, the sensors 11 through 15 (not shown) shown in FIG. 1 are connected to the navigation apparatus 80.

In the fourth embodiment, the processing for generating rectangular area map information is executed with a recording medium storing map information, for example, a CD-ROM, loaded in a drive device such as a CD-ROM drive of the processing device 110. After displaying the map information on a display device connected to the processing device 110, the vehicle driver operates the keyboard or mouse of the processing device 110 to execute the subroutines shown in FIGS. 12 through 14 in the processing device 110. The rectangular area map information generated by this processing is stored in a storage device such as an internal memory of the processing device 110 or a hard disk. The processing for storing the generated rectangular area map information into the auxiliary storage device 38 is executed with the processing device 110 connected to the navigation apparatus 80 via a communication line. When the driver operates the input device 22 of the navigation apparatus 80, a predetermined command is issued to the processing device 110. In accordance with this command, the processing device 110 is remotely operated to supply the generated rectangular area map information to the navigation apparatus 80. The navigation apparatus 80 stores the supplied rectangular area map information into the auxiliary storage device 38. The processing for storing the rectangular area map information into the auxiliary storage device 38 of the navigation apparatus 80 may alternatively be executed by the driver by operating the keyboard or mouse of the processing device 110 to supply the rectangular area map information to the navigation apparatus 80.

When traveling the vehicle with the navigation apparatus 80 on-board, the processing device 110 is disconnected from the navigation apparatus 80 as with the second and third embodiments, and the sensors 11 through 15 such as the GPS are connected to the navigation apparatus 80 storing the rectangular area map information, thereby displaying the information such as the rectangular area map information and the vehicle's current location on the navigation apparatus 80 while the vehicle is traveling.

Figure 24B:
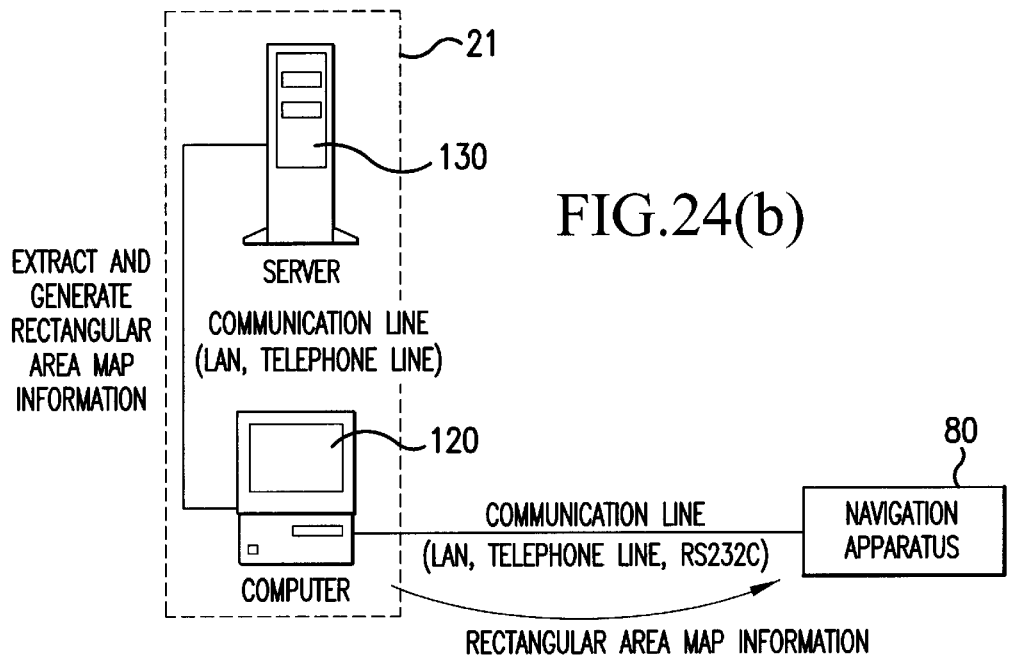

FIG. 24(b) depicts an in-vehicle navigation apparatus practiced as the fifth embodiment of the invention. In the fifth embodiment, the map information supply device 21 is equivalent to a processing device 120, for example, a computer and a server 130, for example, a server on the Internet. The map information for use in generating rectangular area map information is stored in the server 130. The processing device 120 is connected to the server 130 via a communication line, for example, a LAN or a telephone line. When the driver operates the keyboard or mouse of the processing device 120, the subroutines shown in FIGS. 12 through 14 are executed in the processing device 120. The processing device 120 reads the map information about a predetermined area from the server 130 and displays the map information on a display device connected to the processing device 120. The desired rectangular area map information generated in the processing device 120 is stored in a storage device such as a memory or a hard disk of the processing device 120. The processing for storing the generated rectangular area map information into the auxiliary storage device 38 of the navigation apparatus 80 is executed with the processing device 120 connected to the navigation apparatus 80 via a communication line. When the driver operates the input device 22 of the navigation apparatus 80, a predetermined command is issued to the processing device 120. In accordance with this command, the processing device 120 is remotely operated to supply the generated rectangular area map information to the navigation apparatus 80. The navigation apparatus 80 stores the supplied rectangular area map information into the auxiliary storage device 38. The processing for storing the rectangular area map information into the auxiliary storage device 38 of the navigation apparatus 80 may alternatively be executed by the driver by operating the keyboard or mouse of the processing device 120 to supply the rectangular map information to the navigation apparatus 80.

In the fifth embodiment, as with the second, third, and fourth embodiments, when traveling the vehicle with the navigation apparatus 80 on-board, the processing device 120 is disconnected from the navigation apparatus 80 as with the second and third embodiments, and the sensors 11 through 15 such as the GPS are connected to the navigation apparatus 80 storing the rectangular area map information, thereby displaying the information such as the rectangular area map information and the vehicle's current location on the navigation apparatus 80 while the vehicle is traveling.

Figure 24C:
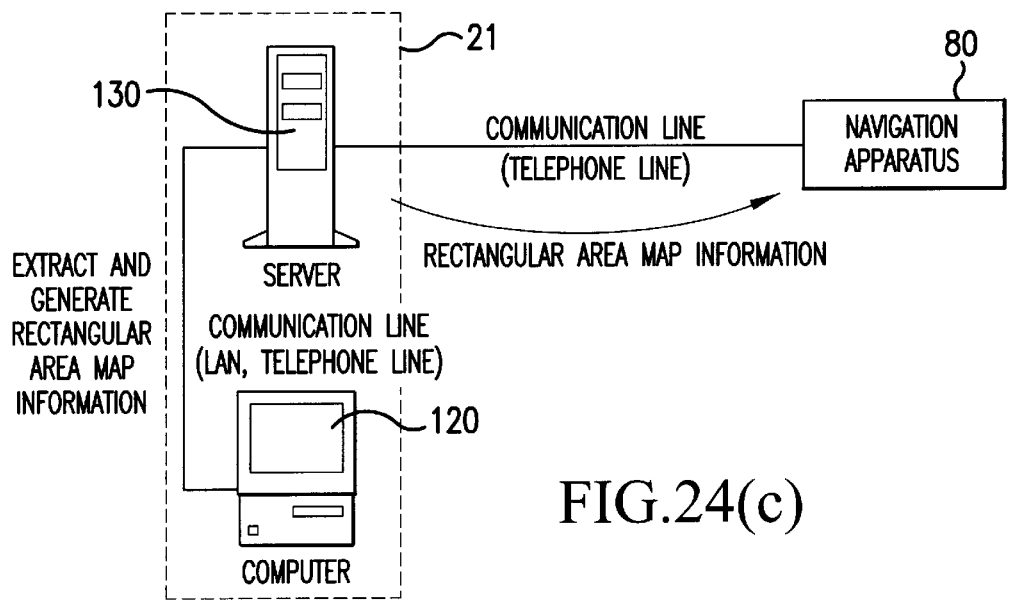

FIG. 24(c) depicts an in-vehicle navigation apparatus practiced as the sixth embodiment of the invention. With reference to FIG. 24(c), components similar to those previously described with FIG. 24(b) are denoted by the same reference numbers and names. In the sixth embodiment, as with the fifth embodiment, the map information supply device 21 is equivalent to a processing device 120, for example, a computer and a server 130, for example, a server on the Internet. In the sixth embodiment, as with the fifth embodiment, rectangular area map information is generated in the processing device 120, which supplies the generated rectangular area map information to the server 130, which stores the supplied rectangular area map information. The processing for storing the generated rectangular area map information into the auxiliary storage device 38 of the navigation device 80 is executed with the server 130 connected to the navigation apparatus 80 via a communication line. When the driver operates the input device 22 of the navigation apparatus 80, the rectangular area map information is supplied to the navigation apparatus 80. The navigation apparatus 80 stores the supplied rectangular area map information into the auxiliary storage device 38.

The sixth embodiment allows the vehicle driver to obtain the rectangular area map information from the server 130 at a travel destination or during traveling by connecting the navigation apparatus 80 to the server 130 via a communication line such as a telephone line.

If the configuration in which the rectangular area map information is read from a server is used in the above-mentioned second through sixth embodiments, all the rectangular area map information need not be stored in the in-vehicle navigation apparatus; instead, only the rectangular area information about the areas necessary at current traveling points may be retrieved from the server and displayed on the navigation apparatus. This configuration can further reduce the storage space of the storage device such as the RAM in the in-vehicle navigation apparatus.

In the above-mentioned first through sixth embodiments, the embodied in-vehicle navigation apparatuses are used for the map information display apparatus for navigating vehicles. It will be apparent to those skilled in the art that these navigation apparatuses may also be used by a walking person as long as these apparatuses can detect walker's current location.

In the above-mentioned second through sixth embodiments, if the vehicle's current location detected by the sensors such as the GPS is found outside a planned route, a route newly planned in accordance with a return route to the initially planned route and the destination may be displayed.

It should be noted that "rectangular area" as used herein denotes an area along the length of a planned route. Therefore, the rectangular area may end in another shape than square; for example a half circle or a half ellipse.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An in-vehicle navigation apparatus, comprising:
   current positional information generating means for detecting a current location of a vehicle and generating current positional information;
   map information storage means for storing map information including road information;
   display map information generating means for reading a predetermined area of map information from said map information storage means on the basis of said current positional information and generating display map information from the map information thus read;
   display means for displaying said display map information and said current positional information;
   travel route planning means for planning a travel route of said vehicle on the basis of said road information; and
   vehicle speed detecting means for detecting a speed at which said vehicle travels,
   wherein said display map information generating means changes a size of an extending area which extends along said travel route in accordance with said vehicle speed and extracts map information corresponding to said extending area from said map information read from said map information storage means, thereby providing said display map information;
   wherein said extending area is a rectangular area extending along said travel route and said display map information generating means changes an area width of said rectangular area in accordance with said vehicle speed and extracts map information on said rectangular area from said map information read from said map information storage means, thereby providing said display map information.

2. The in-vehicle navigation apparatus according to claim 1, wherein said display map information generating means has vehicle speed determination means for determining if said vehicle speed is higher than a predetermined speed.

3. The in-vehicle navigation apparatus according to claim 2, wherein, if said vehicle speed determination means determines that said vehicle speed is less than said predetermined speed, said display map information generating means uses said map information read from said map information storage means as said display map information, and said display means displays said display map information, said current positional information, and said travel route.

4. The in-vehicle navigation apparatus according to claim 2, wherein, if said vehicle speed determination means determines that said vehicle speed is higher than said predetermined speed, said display map information generating means sets the size of said extending area to zero and said display means displays said current positional information and said travel route.

5. The in-vehicle navigation apparatus according to claim 2, wherein, if said vehicle speed determination means determines that said vehicle speed is higher than said predetermined speed, said display map information generating means uses, as said display map information, rectangular area map information extracted with a predetermined width as said area width.

6. The in-vehicle navigation apparatus according to claim 1, wherein an area covered by said map information stored in said map information storage means is an area extending along said travel route and presenting a generally rectangular shape having a width greater than or equal to said area width.

7. A vehicle navigation apparatus, comprising
a navigation module having therein desired starting and destination points, said navigation module being capable of detecting and comparing vehicle speed with at least one predetermined reference speed;
an output device operatively interfaced with said navigation module, said output device displaying the desired starting and destination points and a calculated navigable route representation therebetween,
wherein said output device displays limited map detail with respect to the calculated navigable route representation when a vehicle speed exceeds said at least one predetermined reference speed, said limited map detail consists of road representations extending a predetermined distance from sides of the calculated navigable route representation along an entire length thereof.

8. The vehicle navigation device according to claim 7, wherein said limited map detail is determined based upon specific area surrounding an entire length of the calculated navigable route representation.

9. The vehicle navigation device according to claim 7, wherein said predetermined distance is represented in one of kilometers and miles.

10. The vehicle navigation device according to claim 7, wherein said limited map detail consists of road representations and landmark data extending a predetermined distance from sides of the calculated navigable route representation along an entire length thereof.

11. The vehicle navigation device according to claim 10, wherein said predetermined distance is represented in one of kilometers and miles.

12. A method for displaying navigation information, comprising the steps of:
determining a starting point and a destination point;
calculating a navigable route between the starting point and the destination point;
displaying the starting point, destination point and the navigable route; and
limiting map data displayed along sides of the navigable route to only road representations when the vehicle speed exceeds a predetermined value.

13. The method according to claim 12, wherein the step of limiting does not allow any map data displayed when the vehicle speed exceeds a predetermined value.

14. The method according to claim 12, wherein the step of limiting limits the map data displayed along the sides of the navigable route to only road representations and landmark information when the vehicle speed exceeds a predetermined value.

15. An in-vehicle navigation method, comprising:
detecting a current location of a vehicle;
obtaining a desired destination point for the vehicle;
generating current positional information to include the current location of the vehicle and the desired destination point;
reading an area of map information from a map information storage device on the basis the current positional information;
generating display map information from the map information thus read;
displaying the display map information and the current positional information;
planning a travel route of the vehicle on the basis of the current positional information;
detecting a speed at which the vehicle is traveling; and
changing a size of an extending area of the display map information of said displaying, which extends along the travel route, in accordance with a speed of the vehicle;
wherein said extending area is a rectangular area extending along said travel route and said display map information generating means changes an area width of said rectangular area in accordance with said vehicle speed and extracts map information on said rectangular area from said map information read from said map information storage means, thereby providing said display map information.

* * * * *